United States Patent
Zeng et al.

(10) Patent No.: US 12,511,488 B2
(45) Date of Patent: Dec. 30, 2025

(54) DOCUMENT IMAGE PROCESSING INCLUDING TOKENIZATION OF NON-TEXTUAL SEMANTIC ELEMENTS

(71) Applicant: IRON MOUNTAIN INCORPORATED, Portsmouth, NH (US)

(72) Inventors: Zhihong Zeng, Acton, MA (US); Zhi Chen, Montreal (CA); Ankit Chouksey, Bhopal (IN); Sandeep Kumar, Rohtas (IN); Anwar Chaudhry, Mississauga (CA); Narasimha Goli, Tampa, FL (US)

(73) Assignee: Iron Mountain Incorporated, Boston, MA (US)

( * ) Notice: Subject to any disclaimer, the term of this patent is extended or adjusted under 35 U.S.C. 154(b) by 251 days.

(21) Appl. No.: 18/348,574

(22) Filed: Jul. 7, 2023

(65) Prior Publication Data
US 2023/0351115 A1 Nov. 2, 2023

Related U.S. Application Data

(63) Continuation-in-part of application No. 17/694,301, filed on Mar. 14, 2022.
(Continued)

(51) Int. Cl.
*G06F 40/30* (2020.01)
*G06F 40/284* (2020.01)
(Continued)

(52) U.S. Cl.
CPC ............ *G06F 40/30* (2020.01); *G06F 40/284* (2020.01); *G06F 40/40* (2020.01); *G06V 30/413* (2022.01)

(58) Field of Classification Search
None
See application file for complete search history.

(56) References Cited

U.S. PATENT DOCUMENTS

| | | | | |
|---|---|---|---|---|
| 6,562,077 B2* | 5/2003 | Bobrow | ............... | G06F 16/93 |
| | | | | 715/204 |
| 8,719,005 B1* | 5/2014 | Lee | ..................... | G06N 5/025 |
| | | | | 707/706 |

(Continued)

OTHER PUBLICATIONS

U.S. Appl. No. 17/694,301, Final Office Action, Mailed on Feb. 3, 2025, 16 pages.
(Continued)

*Primary Examiner* — Jesse S Pullias
(74) *Attorney, Agent, or Firm* — Kilpatrick Townsend & Stockton LLP

(57) ABSTRACT

A method of document image processing comprises, based on at least a document page image, generating a plurality of semantic tokens that includes a plurality of word tokens and a plurality of special tokens. Each special token among the plurality of special tokens represents a non-textual semantic element of the document image, and generating the plurality of semantic tokens includes predicting, for each special token among the plurality of special tokens, a token type of the special token. The method also comprises generating, for each semantic token among the plurality of semantic tokens, a corresponding semantic token embedding among a plurality of semantic token embeddings; and applying a trained model to process an input that is based on the plurality of semantic token embeddings and a plurality of visual token embeddings based on at least the document page image to generate a semantic processing result.

19 Claims, 21 Drawing Sheets

| | | | | | | | | |
|---|---|---|---|---|---|---|---|---|
| type embedding | 0 | 0 | ----- | 0 | 1 | 0 | 0 | ----- | 0 |
| 2d pos embedding (x) | 0 | 20 | ----- | 120 | 10 | 22 | 50 | ----- | 1000 |
| 2d pos embedding (y) | 0 | 0 | ----- | 0 | 50 | 50 | 50 | ----- | 1000 |
| 1d pos embedding | 1 | 2 | ----- | 8 | 9 | 10 | 11 | ----- | 512 |
| visual embedding | v1 | v2 | ----- | v8 | v9 | v10 | v11 | ----- | v512 |
| token embedding | seller | assigns | ----- | to | _c_ | assigned | with | ----- | |

Related U.S. Application Data

(60) Provisional application No. 63/160,403, filed on Mar. 12, 2021.

(51) Int. Cl.
*G06F 40/40* (2020.01)
*G06V 30/413* (2022.01)

(56) References Cited

U.S. PATENT DOCUMENTS

| | | | |
|---|---|---|---|
| 10,223,344 B2* | 3/2019 | Dakin | G06F 40/274 |
| 10,896,357 B1 | 1/2021 | Corcoran et al. | |
| 10,970,534 B2 | 4/2021 | Kozlovsky et al. | |
| 11,138,425 B2 | 10/2021 | Schäfer | |
| 11,188,746 B1 | 11/2021 | Patel et al. | |
| 11,862,305 B1 | 1/2024 | Sethi et al. | |
| 11,954,139 B2 | 4/2024 | Paruchuri et al. | |
| 12,190,043 B2* | 1/2025 | Kaza | G06F 40/284 |
| 12,292,869 B2* | 5/2025 | Hariharan | G06V 30/416 |
| 2009/0300482 A1 | 12/2009 | Summers et al. | |
| 2010/0174985 A1 | 7/2010 | Levy et al. | |
| 2012/0063684 A1* | 3/2012 | Denoue | G06V 30/412 |
| | | | 382/175 |
| 2012/0078908 A1 | 3/2012 | Djordjevic et al. | |
| 2015/0026556 A1 | 1/2015 | Stadermann et al. | |
| 2015/0242386 A1 | 8/2015 | Moreno Mengibar et al. | |
| 2020/0004815 A1 | 1/2020 | Weisberg et al. | |
| 2020/0167558 A1* | 5/2020 | Yang | G06V 30/413 |
| 2020/0342221 A1 | 10/2020 | Sampath et al. | |
| 2021/0004584 A1 | 1/2021 | Bildner et al. | |
| 2021/0073535 A1 | 3/2021 | Enomoto | |
| 2021/0209551 A1* | 7/2021 | Navarra | G06F 16/93 |
| 2021/0240975 A1 | 8/2021 | Sundell et al. | |
| 2021/0397944 A1* | 12/2021 | Lakshmanan | G06F 16/355 |
| 2022/0036108 A1 | 2/2022 | Zhang | |
| 2022/0036693 A1 | 2/2022 | Zhang et al. | |
| 2022/0300834 A1 | 9/2022 | Zeng et al. | |
| 2022/0382975 A1* | 12/2022 | Gu | G06F 40/216 |

OTHER PUBLICATIONS

U.S. Appl. No. 17/696,603, Non-Final Office Action, Mailed on Mar. 13, 2025, 31 pages.

Kissos et al., "Ocr Error Correction Using Character Correction and Feature-based Word Classification", In 2016 12th IAPR Workshop on Document Analysis Systems (DAS), Apr. 11-14, 2016, 6 pages.

Mor et al., "Confidence Prediction for Lexicon-Free OCR", 2018 Institute of Electrical and Electronics Engineers Winter Conference on Applications of Computer Vision, Mar. 12-15, 2018, pp. 218-225.

Shi et al., "An End to End Trainable Neural Network for Image-Based Sequence Recognition and its Application to Scene Text Recognition", Institute of Electrical and Electronics Engineers Transactions on Pattern Analysis and Machine Intelligence, vol. 39, No. 11, Nov. 2017, pp. 2298-2304.

U.S. Appl. No. 17/694,301, "Non-Final Office Action", Jul. 24, 2024, 17 pages.

Girshick, "Fast R-CNN", Microsoft Research, Available Online at: https://arxiv.org/pdf/1504.08083.pdf, Sep. 27, 2015, 9 pages.

Girshick, Ross, et al., "Rich feature hierarchies for accurate object detection and semantic segmentation", arXiv:1311.2524v5 [cs.CV], Oct. 22, 2014, pp. 1-21.

Li, Fei-Fei, et al., "Lecture 11: Detection and Segmentation", May 10, 2017, pp. 1-95.

Redmon, Joseph, et al., "You Only Look Once: Unified, Real-Time Object Detection", arXiv:1506.02640v5, May 9, 2016, pp. 1-10.

Ren, Shaoqing, et al., "Faster R-CNN: Towards Real-Time Object Detection with Region Proposal Networks", arXiv:1506.01497v3, Jan. 6, 2016, pp. 1-14.

Social Security Bulletin, "Meaning of the Social Security Number", vol. 45, No. 11, Nov. 1982, pp. 29-30.

* cited by examiner

FEDERAL TRUTH-IN-LENDING DISCLOSURES

| ANNUAL PERCENTAGE RATE<br>The cost of your credit as a yearly rate. | FINANCE CHARGE<br>The dollar amount the credit will cost you. | Amount Financed<br>The amount of credit provided to you or on your behalf. | Total of Payments<br>The amount you will have paid after you have made all payments as scheduled. | Total Sale Price<br>The total cost of your purchase on credit, including your down payment of $ 3,000.00 |
|---|---|---|---|---|
| 23.550 % | $ 20,128.80 | $ 22,968.96 | $ 43,097.76 | $ 46,097.76 |

Your Payment Schedule Will Be:

| Number of Payments | Amount of Payments | When Payments Are Due |
|---|---|---|
| 72 | 598.58 | Monthly beginning 09/09/19 |
| N/A | N/A | |

Or As Follows:

Insurance. You may buy the physical damage insurance this contract requires (see back) from anyone you choose who is authorized to sell such insurance in Virginia. Your choice will not affect our decision to extend credit or the terms of this contract. You are not required to buy any other insurance to obtain credit unless the box indicating Vendor's Single Interest insurance is required is checked below.

If any insurance is checked below, policies or certificates from the named insurance companies will describe the terms and conditions.

Check the insurance you want and sign below.
Optional Credit Insurance

☐ Credit Life: ☐ Buyer ☐ Co-Buyer ☐ Both
☐ Credit Disability: ☐ Buyer ☐ Co-Buyer ☐ Both Premium:
Credit Life $ ___N/A___
Credit Disability $ ___N/A___
Insurance Company Name
N/A

FIG. 3B see the rest of this contract for other important agreements.

NOTICE TO THE BUYER: a) Do not sign this contract before you read it or if it contains any blank spaces. b) You are entitled to an exact copy of the contract you sign. Keep it to protect your legal rights.

You agree to the terms of this contract. You confirm that before you signed this contract, we gave it to you, and you were free to take it and review it. You acknowledge that you have read all pages of this contract, including the arbitration provision on page 5, before signing below. You confirm that you received a completely filled-in copy when you signed it.

Buyer Signs X*Carrie Suarez*  Date 08/21/2020  Co-Buyer Signs X*Candor Suarez*  08/21/2020
                                                                      Title N/A
Print Name N/A

FIG. 6A

☐ Assigned with recourse      ☐ Assigned without recourse      ☐ Assigned with limited recourse

ENTIRE AGREEMENT

This Contract contains the entire agreement between you and us relating to this Contract. We may agree to extend or defer a payment and provide you written confirmation. Any other change to this Contract must be in a writing signed by us. No oral modifications to this Contract are binding.

This Contract has 4 pages, plus any optional GAP Waiver Agreement. This is Page 4. By signing below you represent that you have read and agree to all provisions on all pages, including the Arbitration Provision on Page 3 of this Contract. You are also confirming that you have received a completed copy of this Contract and any optional GAP Waiver Agreement, each of which has been signed by the _____.

Seller: _____

By: _____

Buyer's Signature _____

Co-Buyer's Signature _____

ASSIGNMENT

Seller hereby sells, assigns and transfers to _____ (Assignee) this Contract, all obligations of Buyer and Co-Buyer hereunder, all rights, powers, and privileges now or given to Seller, and all right, title and interest of Seller in and to the property securing this Contract. If on the date of this assignment there is in effect a Dealer Agreement between Seller and Assignee pertaining to the sale of contracts to Assignee by Seller, this Contract is assigned to Assignee subject to all the terms and conditions of that Dealer Agreement.

Seller/Assignor: _____

Seller/Assignor: _____

FIG. 11

Seller assigns its interest in this contract to

☐ Assigned with recourse   ☒ Assigned without recourse

FIG. 12A

Seller assigns its interest in this contract to

☐ Assigned with recourse   ☒ Assigned without recourse

FIG. 12B

Credit Life
☐ Single  ☐ Joint  ☒ None
Premium $ N/A    Term N/A
Insured N/A

Credit Disability
☐ Single  ☐ Joint  ☒ None
Premium $ N/A    Term N/A

FIG. 12C

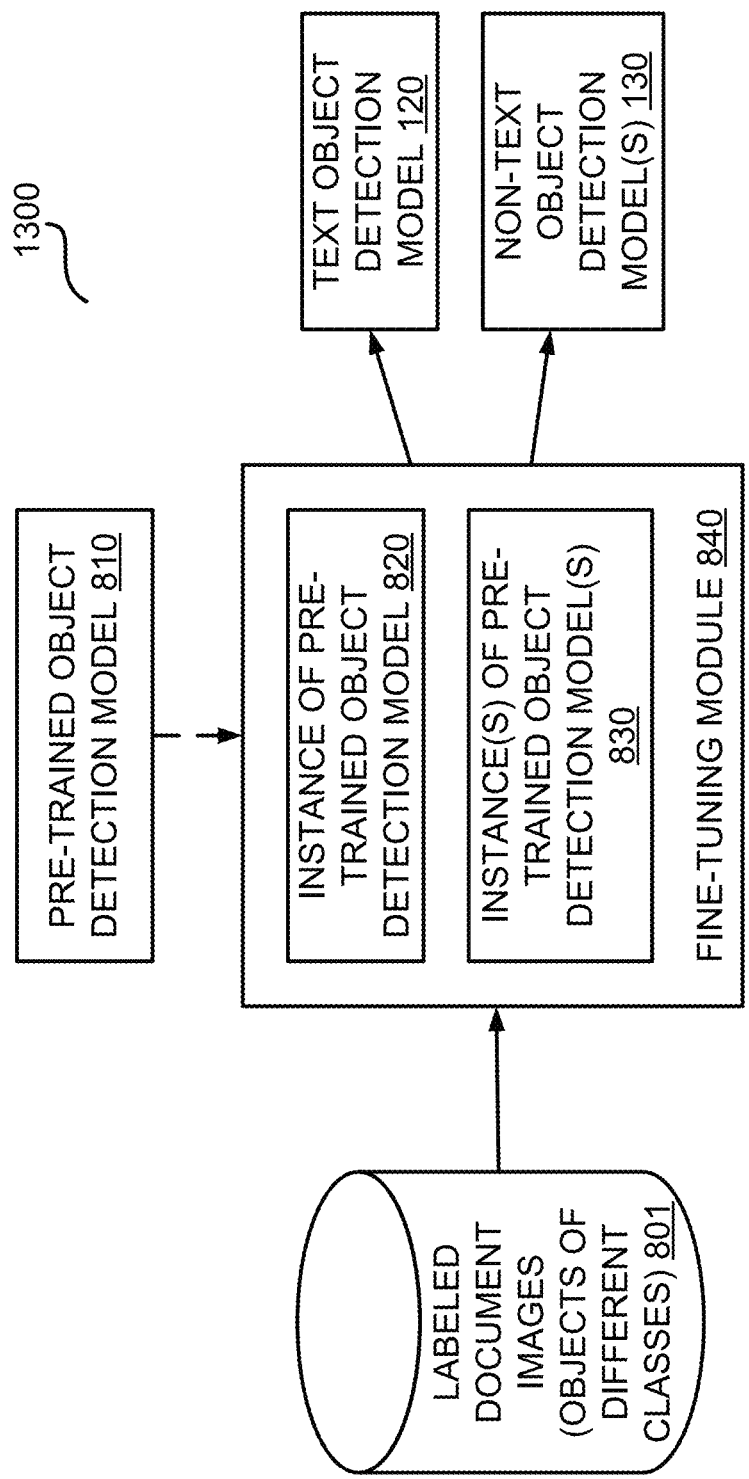

Seller assigns its interest in this contract to
☐ Assigned with recourse

FIG. 18A

| | | | | | | |
|---|---|---|---|---|---|---|
| type embedding | 0 | 0 | 0 | 1 | 0 | 0 |
| 2d pos embedding (x) | 0 | 20 | 120 | 10 | 22 | 50 | 1000 |
| 2d pos embedding (y) | 0 | 0 | 0 | 50 | 50 | 50 | 1000 |
| 1d pos embedding | 1 | 2 | 8 | 9 | 10 | 11 | 512 |
| visual embedding | v1 | v2 | v8 | v9 | v10 | v11 | v512 |
| token embedding | seller | assigns | to | _c_ | assigned | with | |

FIG. 18B

DOCUMENT IMAGE PROCESSING INCLUDING TOKENIZATION OF NON-TEXTUAL SEMANTIC ELEMENTS

CROSS-REFERENCE TO RELATED APPLICATIONS

This application is a continuation-in-part of and claims priority to U.S. patent application Ser. No. 17/694,301 filed Mar. 14, 2022, and entitled "DOCUMENT ENTITY EXTRACTION USING DOCUMENT REGION DETECTION," which claims the benefit of U.S. patent application Ser. No. 63/160,403, filed Mar. 12, 2021, and entitled "DOCUMENT ENTITY EXTRACTION USING DOCUMENT REGION DETECTION." The entirety of both of which is incorporated herein by reference for all purposes.

TECHNICAL FIELD

The field of the present disclosure relates to document image processing. More specifically, the present disclosure relates to techniques for tokenization and embedding of non-textual semantic elements.

BACKGROUND

An unstructured document may contain content that lacks sufficient structure to be easily indexed. Entity extraction from unstructured documents is complicated by such lack of structure.

SUMMARY

Certain embodiments involve document entity extraction using multiple instances of a pre-trained object detection model that have been separately fine-tuned to detect different respective classes of regions of interest. For example, a method for entity extraction includes processing document images to detect a plurality of regions of interest that includes text objects and non-text objects. The method also includes producing, based on a corresponding region of interest among the plurality of regions of interest, each of a plurality of text strings; and processing the text strings to identify a plurality of entities, wherein each of the plurality of entities is associated with a corresponding region of interest among the plurality of regions of interest. In this method, processing the document images involves applying a text object detection model to the document images to detect the text objects; and applying at least one non-text object detection model to the document images to detect the non-text objects. Prior to processing the document images, at least two of the object detection models among the text object detection model and the at least one non-text object detection model were generated by fine-tuning respective instances of a pre-trained object detection model.

In some embodiments, techniques for document entity extraction are provided. For example, a process may involve processing document images to detect a plurality of regions of interest that includes text objects and non-text objects; for each of the plurality of regions of interest, producing a corresponding text string; and processing the text strings to identify entities. Processing the document images may involve applying a text object detection model to the document images to detect the text objects; and applying at least one non-text object detection model to the document images to detect the non-text objects. Prior to processing the document images, at least two object detection models among the text object detection model and the at least one non-text object detection model were generated by fine-tuning respective instances of a pre-trained object detection model.

Certain embodiments involve semantic processing of at least one document page image using special tokens that represent different corresponding types of non-textual semantic elements in the at least one document page image. For example, a computer-implemented method of document image processing comprises, based on at least a document page image, generating a plurality of semantic tokens that includes a plurality of word tokens and a plurality of special tokens. Each special token among the plurality of special tokens represents a non-textual semantic element of the document image, and generating the plurality of semantic tokens includes predicting, for each special token among the plurality of special tokens, a token type of the special token. The method also comprises generating, for each semantic token among the plurality of semantic tokens, a corresponding semantic token embedding among a plurality of semantic token embeddings. Each semantic token embedding indicates a position of the corresponding semantic token within the document image, and each semantic token embedding that corresponds to a special token indicates the predicted token type of the corresponding special token. The method also comprises, based on at least the document page image, generating a plurality of visual token embeddings, wherein each visual token embedding indicates a position of a corresponding visual token within the document page image; and applying a trained model to process an input that is based on the plurality of semantic token embeddings and the plurality of visual token embeddings to generate a semantic processing result, wherein the semantic processing result includes at least one of the following: a predicted location for each of a plurality of entities in the document page image, a predicted document type of a document page depicted in the document page image, or a predicted answer to a question about the document page depicted in the document page image.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 shows a portion of a document image that includes examples of text objects, according to certain aspects of the present disclosure.

FIGS. 3A and 3B show portions of document images that include examples of signature objects, according to certain aspects of the present disclosure.

FIG. 6A shows examples of neighbor regions for signature objects, according to certain aspects of the present disclosure.

FIG. 6B shows an example of a neighbor region for a checkbox object, according to certain aspects of the present disclosure.

FIG. 10 shows an example of a portion of a labeled document image in which five text objects are labeled, according to certain aspects of the present disclosure.

FIG. 11 shows an example of a portion of a labeled document image in which four signature objects are labeled, according to certain aspects of the present disclosure.

FIGS. 12A-12C show examples of portions of labeled document images in which checkbox objects are labeled, according to certain aspects of the present disclosure.

FIG. 13 shows a block diagram of a further implementation of the model training system, according to certain aspects of the present disclosure.

FIG. 18A shows a block diagram of a model training subsystem, according to certain aspects of the present disclosure.

FIG. 18B shows examples of information to be embedded from the image portion of FIG. 18A, according to certain aspects of the present disclosure.

DETAILED DESCRIPTION

Figure 1:
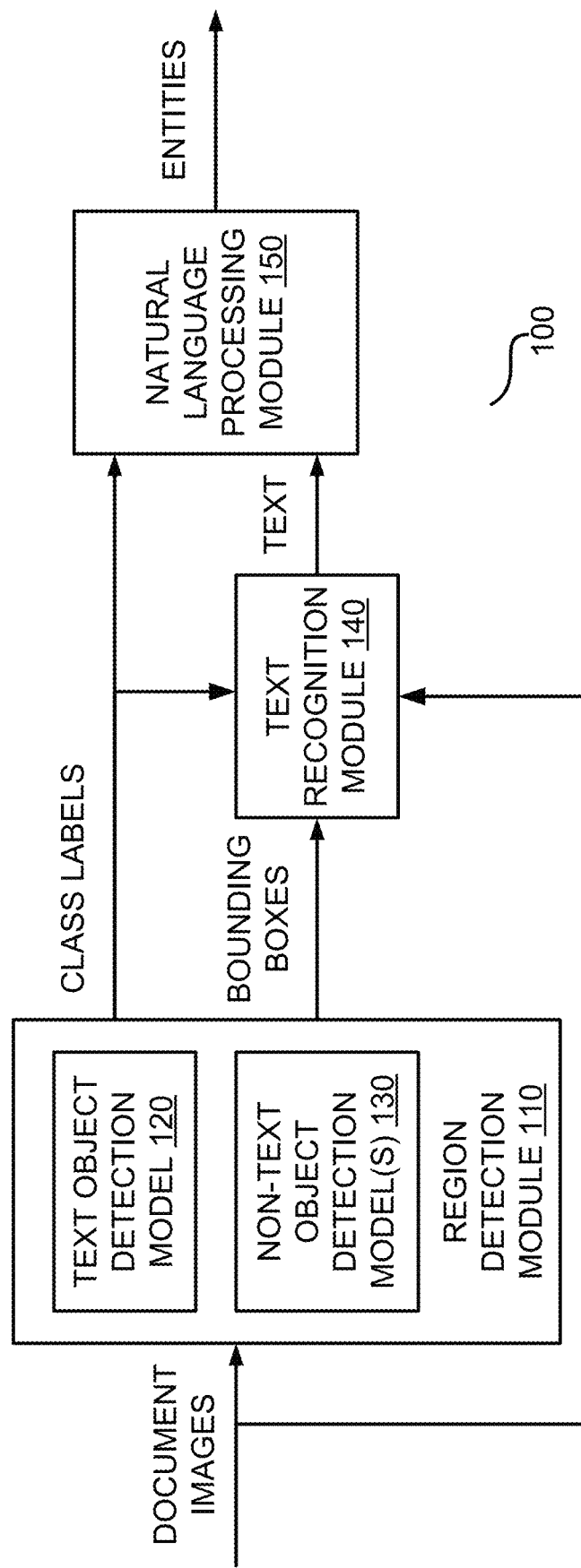
FIG. 1 shows a block diagram of an entity extraction system according to certain aspects of the present disclosure.

The subject matter of embodiments of the present disclosure is described here with specificity to meet statutory requirements, but this description is not necessarily intended to limit the scope of the claims. The claimed subject matter may be implemented in other ways, may include different elements or steps, and may be used in conjunction with other existing or future technologies. This description should not be interpreted as implying any particular order or arrangement among or between various acts or elements except when the order of individual acts or arrangement of elements is explicitly described.

Entity extraction from unstructured digital data, such as unstructured documents (e.g., images obtained by scanning or otherwise digitizing the pages of documents), may play an important role in a document processing workflow. Traditional methods for entity extraction assume that a representation of the unstructured text as produced by an optical character recognition (OCR) operation includes enough of the native structural context of the document to represent entity patterns. This assumption may be invalid, however, when the document includes tables or other multiple blocks, or when the document includes a non-text pattern, such as a biometric signature. Additionally, searching the whole document for the entities, particularly when a large set of documents are being searched, is not computationally efficient.

Certain aspects and examples of the disclosure relate to techniques for extracting entities from unstructured documents (e.g., document images). A computing platform may access one or more unstructured documents and perform processing operations on the documents. In some examples, the processing can include text region detection, signature detection, and checkbox detection on the unstructured document. The processing can also include optical character recognition on the detected regions of the unstructured document to generate a structured text of interest representation. Natural language processing may be performed on the structured text of interest representation to extract desired entities from the unstructured document.

Upon processing the unstructured documents to generate the structured text of interest representation, the computing platform may perform natural language processing, such as key-value detection, bag-of-words modeling, deep neural network (DNN) modeling, or question and answer operations, on content of the unstructured document using the structured text of interest representation. For example, the structured text of interest representation of the unstructured document may provide context to the text content within the unstructured document. In this manner, information of interest from the unstructured document may be extracted.

By utilizing the techniques presented herein, data can be efficiently and contextually extracted from unstructured documents (e.g., document images). Specifically, by integrating text recognition with box detection, a set of structured text representing the unstructured document can be generated.

FIG. 1 shows a block diagram of an entity extraction system 100, according to certain aspects of the present disclosure. As shown in FIG. 1, the entity extraction system 100 includes a region detection module 110 that is configured to receive document images and process them to detect regions of interest (e.g., text objects and non-text objects) within the document images. System 100 also includes a text recognition module 140 that is configured to produce, for each of the regions of interest, a corresponding text string. The text recognition module 140 may be configured, for example, to generate a structured text of interest representation from an unstructured document, such as a scanned image of a document. System 100 also includes a natural language processing (NLP) module 150 that is configured to receive the text strings (e.g., to receive the structured text of interest representation) and to process the text strings to identify entities.

The system 100 may include a conversion module (not shown) that is configured to convert digital documents in a document file format (e.g., PDF) into document images in an image file format (e.g., TIFF). For example, the conversion module may be configured to convert each page of a digital document into a corresponding page image. Document images that have been obtained by scanning or otherwise digitizing the pages of documents may already be in an image file format.

The system 100 may include a pre-processing module (not shown) that is configured to pre-process document images to produce the plurality of document images for input to the system 100. Pre-processing of the image files may include, for example, any of the following operations: de-noising (e.g., Gaussian smoothing), affine transformation (e.g., de-skewing, translation, rotation, and/or scaling), perspective transformation (e.g., warping), normalization (e.g., mean image subtraction), histogram equalization. Pre-processing may include, for example, scaling the document images to a uniform size. In some cases, the object detection models of the region detection module 110 may be configured to accept input images of a particular size (e.g., 640 pixels wide×480 pixels high, 850 pixels wide×1100 pixels high, 1275 pixels wide×1650 pixels high, etc.).

The region detection module 110 is configured to process a plurality of document images to detect a plurality of regions of interest that includes a plurality of text objects and a plurality of non-text objects. Each of the plurality of regions of interest is a region of a corresponding document image among the plurality of document images. As used herein, the term "text object" refers to a region of a document image whose semantic content is indicated by text characters (e.g., letters or numbers) within the region. FIG. 2 shows five examples of text objects (indicated by the shaded bounding boxes).

Figures 3A, 3B:
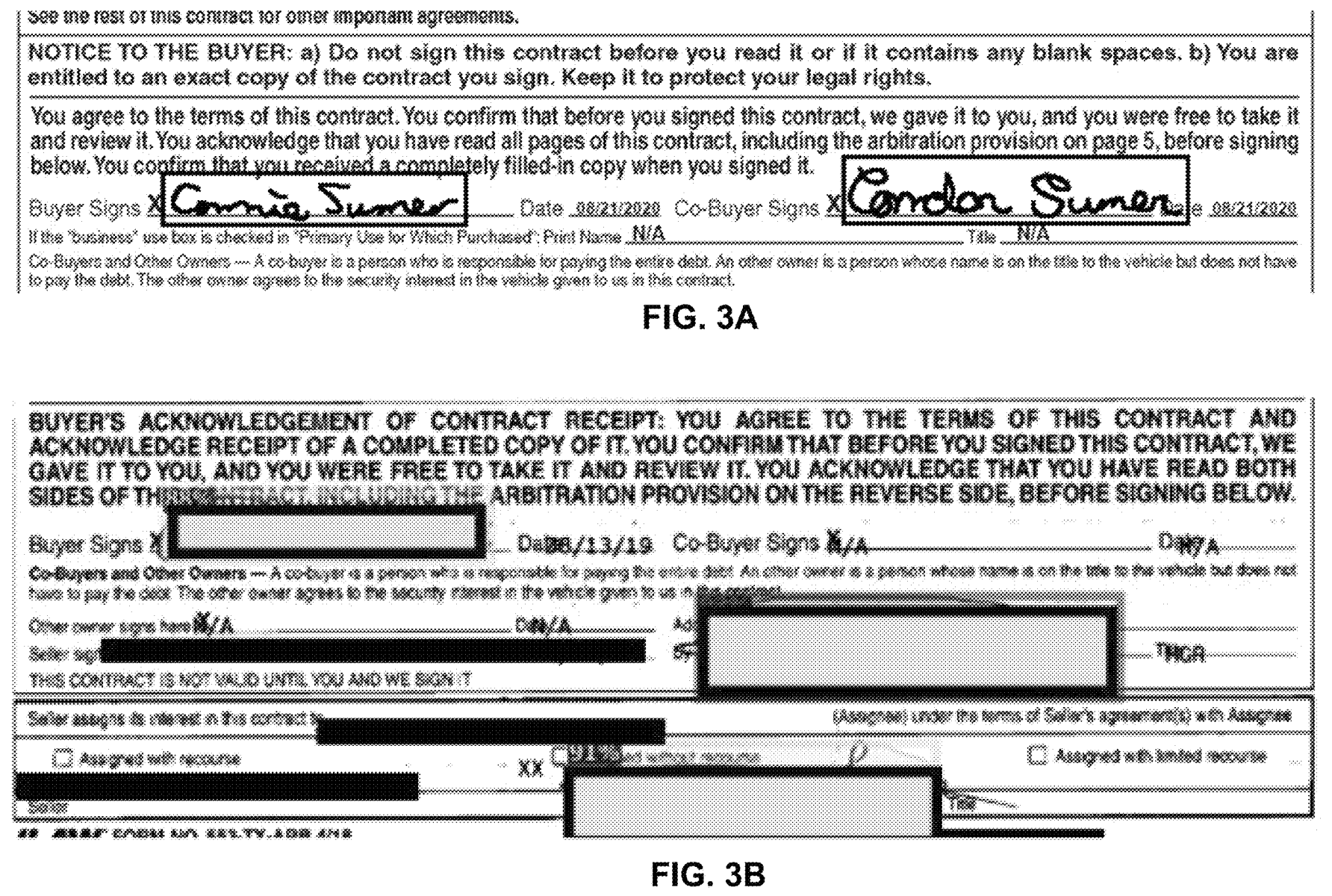
Figure 4:
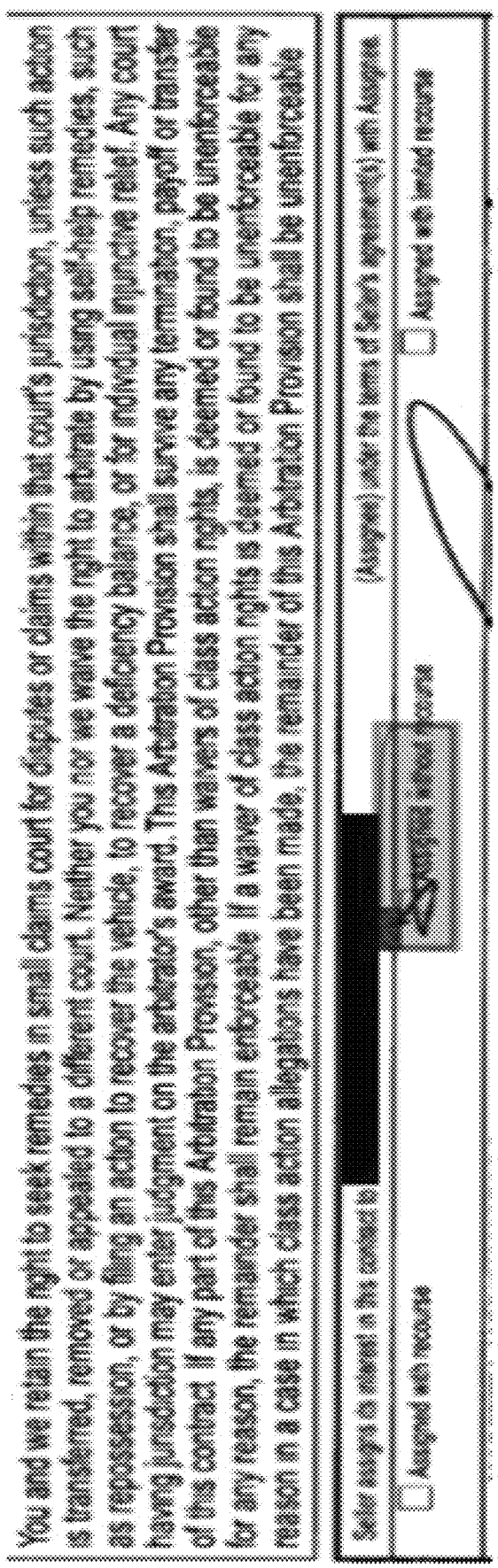
FIG. 4 shows a portion of a document image that includes an example of a checkbox object, according to certain aspects of the present disclosure.

As used herein, the term "non-text object" refers to a region of a document image having semantic content that is indicated at least in part by non-printed (e.g., handwritten) markings or non-text characters (e.g., boxes) within the region. FIGS. 3A, 3B, and 4 show examples of non-text objects (indicated by corresponding bounding boxes). Specifically, FIGS. 3A and 3B (redacted) show several examples of a signature object (an object that includes a signature, such as a biometric (e.g., handwritten) signature), and FIG. 4 shows an example of a checkbox object (an object that includes a marked (e.g., checked) checkbox).

For each document image of the plurality of document images, the region detection module 110 may detect zero or more text objects and zero or more non-text objects. The plurality of document images may include, for example, documents for which the region detection module 110 detects at least one text object and at least one non-text object. Additionally or alternatively, the plurality of document images may include documents for which the region detection module 110 detects one or more text objects and no non-text objects and/or documents for which the region detection module 110 detects no text objects and one or more non-text objects. The plurality of document images may also include documents for which the region detection module 110 detects no text objects or non-text objects.

As shown in FIG. 1, the region detection module 110 is configured to apply a text object detection model 120 and at least one non-text object detection model 130 to the plurality of document images. The text object detection model 120 is configured to detect the plurality of text objects, and the at least one non-text object detection model 130 is(are) configured to detect the plurality of non-text objects. Two or more (and possibly all) of the object detection models 120 and 130 are generated (e.g., by a fine-tuning module 340 as described below) by fine-tuning respective instances of a pre-trained object detection model (e.g., a model 310 as described below).

Figure 5:
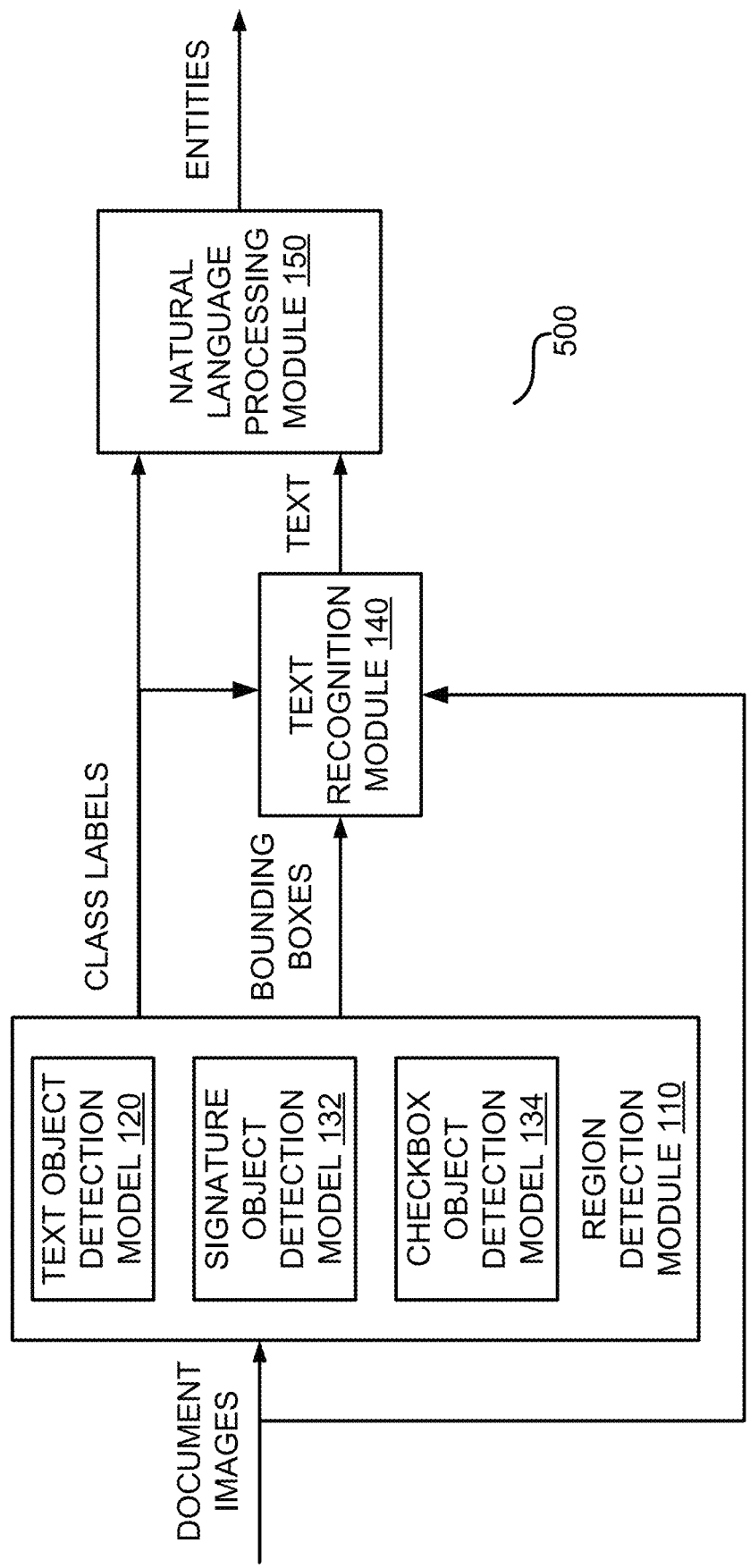
FIG. 5 shows a block diagram of another implementation of the entity extraction system, according to certain aspects of the present disclosure.

The region detection module 110 may be configured to apply the fine-tuned text object detection model 120 to the plurality of document images to detect the plurality of text objects and to apply the fine-tuned non-text object detection model(s) 130 to the plurality of document images to identify the plurality of non-text objects. FIG. 5 shows a block diagram of an implementation 500 of the entity extraction system 100 in which the region detection module 110 is configured to apply the text object detection model 120 to the plurality of document images to detect the plurality of text objects and to apply two fine-tuned non-text object detection models 130 to the plurality of document images to identify the plurality of non-text objects: a signature object detection model 132 to detect a plurality of signature objects and a checkbox object detection model 134 to detect a plurality of checkbox objects. As used herein, the term "checkbox object" refers to a region of interest that includes a marked (e.g., "checked-off") checkbox.

The region detection module 110 is configured to indicate, for each of the detected regions of interest, a bounding box that indicates a boundary of the region of interest within the corresponding document image, and a class label that indicates a class of the region of interest. A bounding box may be indicated by information sufficient to identify the two-dimensional (2D) coordinates of the four corners of the bounding box within the corresponding document image. In one example, a bounding box is indicated by the 2D coordinates of one corner (e.g., the upper-left corner) together with the width and height of the bounding box (e.g., in pixels). In another example, a bounding box is indicated by the 2D coordinates of two opposite corners of the bounding box (e.g., the upper-left and lower-right corners).

The set of classes for text objects may include, for example, amount (e.g., as shown in FIG. 2), home address, etc. In an example, the text object detection model 120 may be trained to identify regions of interest that are associated with prices or rates. The set of classes for non-text objects may include, for example, signature for signature objects (e.g., as in FIG. 3B), checkbox for checkbox objects (e.g., as in FIG. 4), etc. In an example, the signature object detection model 132 may be trained to identify regions of interest that include biometric (e.g., handwritten) signatures, and the checkbox object detection model 134 may be trained to identify regions of interest that include marked (e.g., checked) checkboxes. The region detection module 110 may also be configured to indicate, for each of the detected regions of interest, a confidence of the detection prediction (as shown, for example, in FIG. 2 ('99%'), FIG. 3B ('88%', '93%', '91%'), and FIG. 4 ('96%')).

The text recognition module 140 is configured to produce, for each of the plurality of regions of interest, a corresponding text string (e.g., from an indicated portion of the corresponding document image). As used herein, the term "text string" refers to a string of text characters (possibly including one or more line breaks). As shown in FIG. 1, the text recognition module 140 may be configured to receive, for each of the regions of interest, a bounding box and a class label and to produce a text string from a portion of the corresponding document image that is indicated by the bounding box and the class label. In association with corresponding location information (e.g., the bounding box information of the corresponding regions of interest), the text strings produced by the text recognition module 140 represent structured texts of interest.

The region detection module 110 may identify one or more regions of interest (e.g., text objects) within a document image, and the text recognition module 102 may identify characters, such as letters and numbers, in the regions of interest of the document image. In other words, regions of interest of the document image may be converted by the text recognition module 140 into machine-encoded text representations of corresponding portions of the document image.

For each document image, the text recognition module 140 may provide a structured text of interest representation of the document image. The structured text of interest representation includes text strings produced by the text recognition module 140 from regions of interest within the document image, as detected by the region detection module 110. The structured text of interest representation also includes location information for each text string, such as the corresponding bounding box information of those regions of interest (and possibly the corresponding class labels) as indicated by the region detection module 110.

The text recognition module 140 may be configured to produce, for each of the regions of interest, a text string from an indicated portion of the corresponding document image. For the text regions detected by the region detection module 110, the indicated portion of the corresponding document image may be the portion bounded by the bounding box. For example, the text recognition module 140 may be configured to perform optical character recognition (OCR) on each of the detected text objects (e.g., as indicated by the corresponding bounding boxes) to produce the corresponding text string.

For the non-text regions detected by the region detection module 110 (e.g., signature objects, checkbox objects), the indicated portion of the corresponding document image may include a neighbor region of the portion that is bounded by the bounding box. For example, the text recognition module 140 may be configured to perform OCR on a neighbor region of each of the detected non-text objects to produce the corresponding text string.

The neighbor region may extend to the left of, to the right of, above, and/or below the portion of the document image that is bounded by the bounding box. A dimension of the neighbor region may be based on a corresponding dimension of the non-text region (e.g., as indicated by the bounding box), and a shape of the neighbor region relative to the non-text region may be based on the class of the non-text region. As shown in FIG. 6A, for example, the neighbor region for a signature object may include an area to the left of the signature object and may also include an area below the signature object, and the sizes of these areas may be proportional to the size of the signature object. As shown in FIG. 6B, for example, the neighbor region for a checkbox object may include an area to the right of the checkbox region, and the size of this area may be proportional to the size of the checkbox object.

In some implementations of the text recognition module 140, the neighbor region includes the portion bounded by the bounding box. In other implementations of the text recognition module 140, the neighbor region does not include the portion bounded by the bounding box. In further implementations of the text recognition module 140, whether the neighbor region includes or does not include the portion bounded by the bounding box is based on the class of the non-text region (e.g., included for signature objects, not included for checkbox objects).

In some examples, a structured document provided to or otherwise accessed by the document entity extraction system 100 may already be in a machine-encoded state. Accordingly, the document entity extraction process may proceed without the optical character recognition operation of the text recognition module 140 on such a document. The text recognition module 140 may be also configured to use other text recognition operations on the document images in place of an optical character recognition operation. For example, the text recognition module 140 may be configured to use optical word recognition, intelligent character recognition, intelligent word recognition, or any other text recognition operations in place of the optical character recognition operation.

The natural language processing (NLP) module 150 is configured to process the plurality of text strings to identify a plurality of entities. For example, the NLP module 150 may be configured to perform natural language processing operations on a structured text of interest representation of an unstructured document (e.g., as generated by the text recognition module 140) to extract particular entities from the unstructured document, where the structured text of interest representation may include, for each of one or more detected regions of interest, the corresponding text string and its location within the unstructured document (e.g., document image). For each of the plurality of text strings, the NLP module 150 may be configured to perform any one or more of the following entity extraction operations on the text string to identify an entity associated with the corresponding region of interest:

1) search for one or more regular expression (regex) patterns (e.g., to find a corresponding substring in the text string);
2) perform key-value detection (to extract a key-value pair, for example, or to find a corresponding value for a given key (e.g., price, payment, etc.));
3) apply a bag-of-words model;
4) apply a DNN model (e.g., an autoencoding-based model, such as BERT (Bi-directional Encoder Representation from Transformers); an autoregressive model, such as XLnet; etc.);
5) apply a question answering model (e.g., to extract an answer to a given question).

For each of at least some of the text strings, the NLP module 150 may be configured to find one or more specified "anchor words" within the text string. Such anchor words may be used to configure an entity extraction operation as noted above (e.g., regex searching, key-value detection, question answering) and/or to filter the results of such an operation (e.g., entity extraction using a bag-of-words or DNN model) to identify relevant entities.

The anchor words may be specified in a dictionary, and the NLP module 150 may be configured to use different dictionaries for text strings that correspond to regions of interest of different classes. For example, the NLP module 150 may be configured to select a dictionary from among a plurality of dictionaries, based on the class of the detected region of interest, and to identify an entity in the corresponding text string based on the dictionary.

In one such example, the NLP module 150 is configured to find one or more anchor words only within text strings that correspond to non-text objects. For non-text objects of a signature object class, for example, the NLP module 150 may be configured to select a dictionary that includes anchor words such as, e.g., 'buyer', 'seller', 'co-buyer', 'assignor', 'assignee', 'signs', 'signature', 'sign', 'sign here'. For non-text objects of a checkbox object class, the NLP module 150 may be configured to select a dictionary that includes anchor words such as, e.g., 'assigned', 'recourse', 'limited', 'with', 'without', 'single', 'joint', 'none'. In another such example, the NLP module 150 is also configured to find one or more anchor words within text strings that correspond to text objects.

The output of the NLP module 150 may be one or more entities from the corresponding unstructured document. For example, the NLP module 150 may be configured to identify and extract a buyer or seller signature (e.g., the signature object that includes the actual biometric signature of the identified party) from a sales agreement, a price number from a sales agreement, particular details identified by checkboxes, or any other entities from the unstructured document. Further examples of entities that may be extracted from text objects include a payment, a price, an annual percentage rate (APR), etc. Further examples of entities that may be extracted from signature objects or their neighbor regions include an identifier of the party who has signed (e.g., buyer, seller, co-buyer, assignee, assignor, etc.), a signature of a buyer, a signature of a seller, a signature of a co-buyer, etc. Further examples of entities that may be extracted from checkbox objects or their neighbor regions of checkbox objects include a transaction type (e.g., with recourse, without recourse, or with limited recourse), a broker status (e.g., buyer's agent, seller's agent, transaction-broker), a marked checkbox, etc. Applications of such entity extraction may include, for example, verifying that a contract is signed by both the buyer and the seller; identifying whether an assignment has been made without recourse; etc.

In an example, the processes of the document entity extraction system 100 may all be performed as microservices of a remote or cloud computing system, or may be implemented in one or more containerized applications on a distributed system (e.g., using a container orchestrator, such as Kubernetes). Alternatively, the processes of the document entity extraction system 100 may be performed locally as modules running on a computing platform associated with the document extraction system 100. In either case, such a system or platform may include multiple processing devices (e.g., multiple computing devices) that collectively perform the process. In some examples, the entity extraction system 100 may be accessed through a detection application programming interface (API). The detection API may be deployed as a gateway to a microservice or a Kubernetes system on which the processes of the document entity extraction system 100 may be performed. The microservice or Kubernetes system may provide computing power to serve large scale document processing operations.

Figure 7:
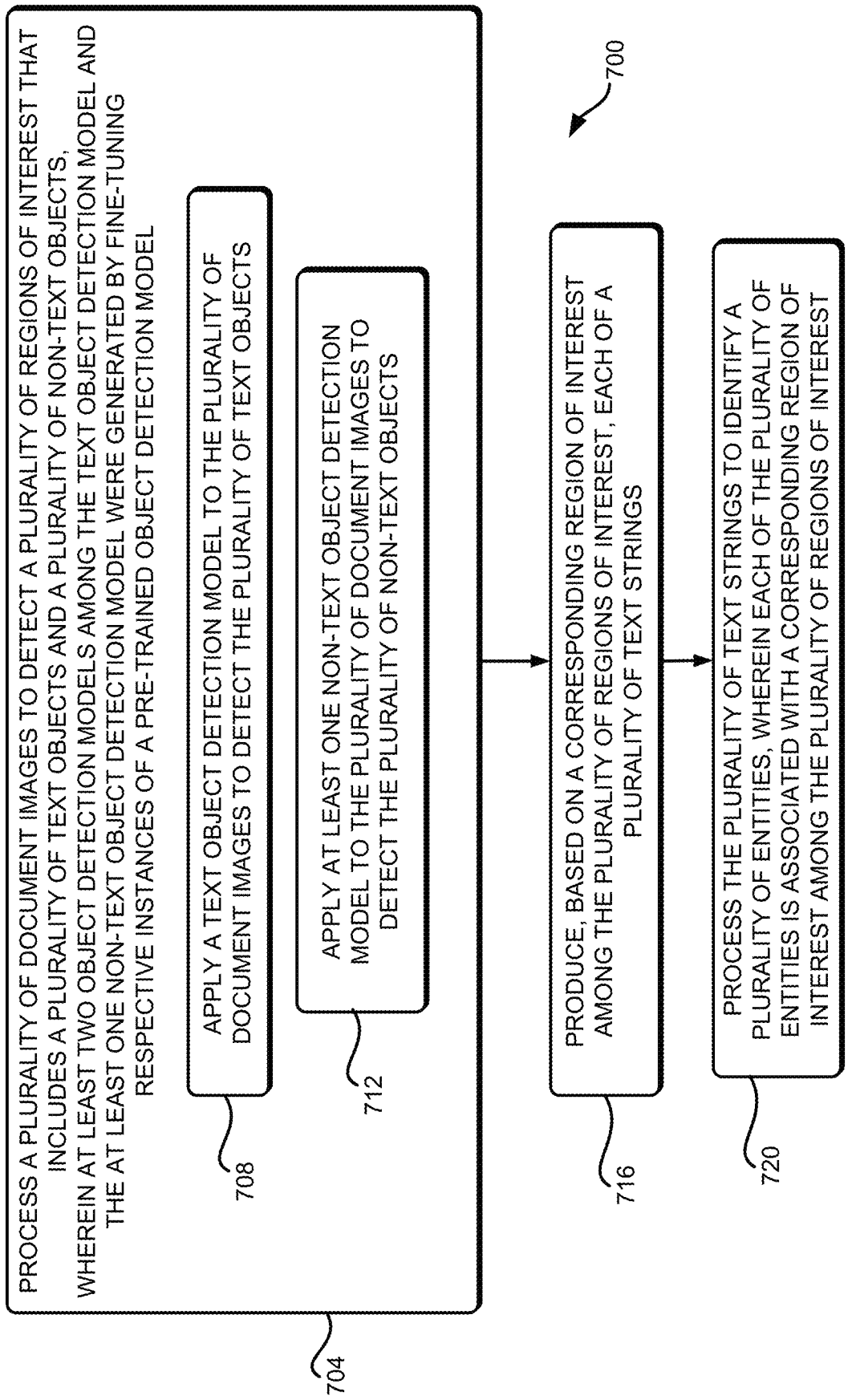
FIG. 7 shows a flowchart of a process of entity extraction, according to certain aspects of the present disclosure.

FIG. 7 depicts an example of a process 700 of entity extraction, according to certain embodiments of the present disclosure. One or more processing devices (e.g., one or more computing devices) implement operations depicted in FIG. 7 by executing suitable program code. For example, process 700 may be executed by an instance of the entity extraction system 100. For illustrative purposes, the process 700 is described with reference to certain examples depicted in the figures. Other implementations, however, are possible.

At block 704, the entity extraction process involves processing (e.g., by a region detection module as described herein) a plurality of document images to detect a plurality of regions of interest that includes a plurality of text objects and a plurality of non-text objects. In an example, the document images are stored in a manner that enables access to the document images by a system executing the process (e.g., the entity extraction system 100). For example, the document images may be stored locally with the entity extraction system, or the entity extraction system may access the document images from a remote storage system (e.g., via a detection API).

Block 704 includes sub-blocks 708 and 712. At block 708, the entity extraction process involves applying a text object detection model to the plurality of document images to detect the plurality of text objects. At block 712, the entity extraction process involves applying at least one non-text object detection model to the plurality of document images to detect the plurality of non-text objects. Prior to the execution of block 704 (e.g., prior to processing the plurality of document images), at least two of the object detection models among the text object detection model and the at least one non-text object detection model have been generated by fine-tuning respective instances of a pre-trained object detection model.

At block 716, the entity extraction process involves producing (e.g., by a text recognition module as described herein), based on a corresponding region of interest among the plurality of regions of interest, each of a plurality of text strings. For example, block 716 may include generating, for each of at least some of the plurality of document images, a corresponding structured text of interest representation that includes, for each of one or more text strings, the text string and a location associated with the text string within the document image.

At block 720, the entity extraction process involves processing (e.g., by a natural language processing module as described herein) the plurality of text strings to identify a plurality of entities, wherein each of the plurality of entities is associated with a corresponding region of interest among the plurality of regions of interest. For example, block 720 may include, for each of the plurality of document images, performing one or more NLP operations on a structured text representation of the document image (e.g., as generated by text recognition module 140) to identify one or more entities of the document image.

One or more pre-trained deep neural networks (e.g., one or more deep convolutional neural networks (CNNs)) may be fine-tuned, in a supervised training process using labeled data, to generate the text object detection model 120 and the non-text object detection model(s) 130 (e.g., signature and checkbox object detection models). In one such example, a first pre-trained deep CNN is fine-tuned, using a first set of labeled data, to generate the text object detection model 120, and respective instances of a second pre-trained deep CNN are fine-tuned, using corresponding sets of labeled data, to generate two or more non-text object detection models (e.g., signature object detection model 132 and checkbox object detection model 134). In another such example, respective instances of a pre-trained deep CNN are fine-tuned, using corresponding sets of labeled data, to generate the text object detection model 120 and the non-text object detection model(s) 130. In each case, the fine-tuning may be performed to generate the corresponding text or non-text object detection model according to a target accuracy (e.g., mean average precision), such as, for example, an average detection prediction accuracy of at least 80%. Any one or more of the object detection models 120, 130, 132, 134 may also be trained to other more-stringent or less-stringent target accuracies. Generally, the larger the corpus of labeled data used to train a model is, the more accurate the resulting model may be. For example, the larger the corpus of labeled data used to fine-tune the corresponding instance of a pre-trained deep CNN is, the more accurate the resulting object detection model may be.

Figure 8:
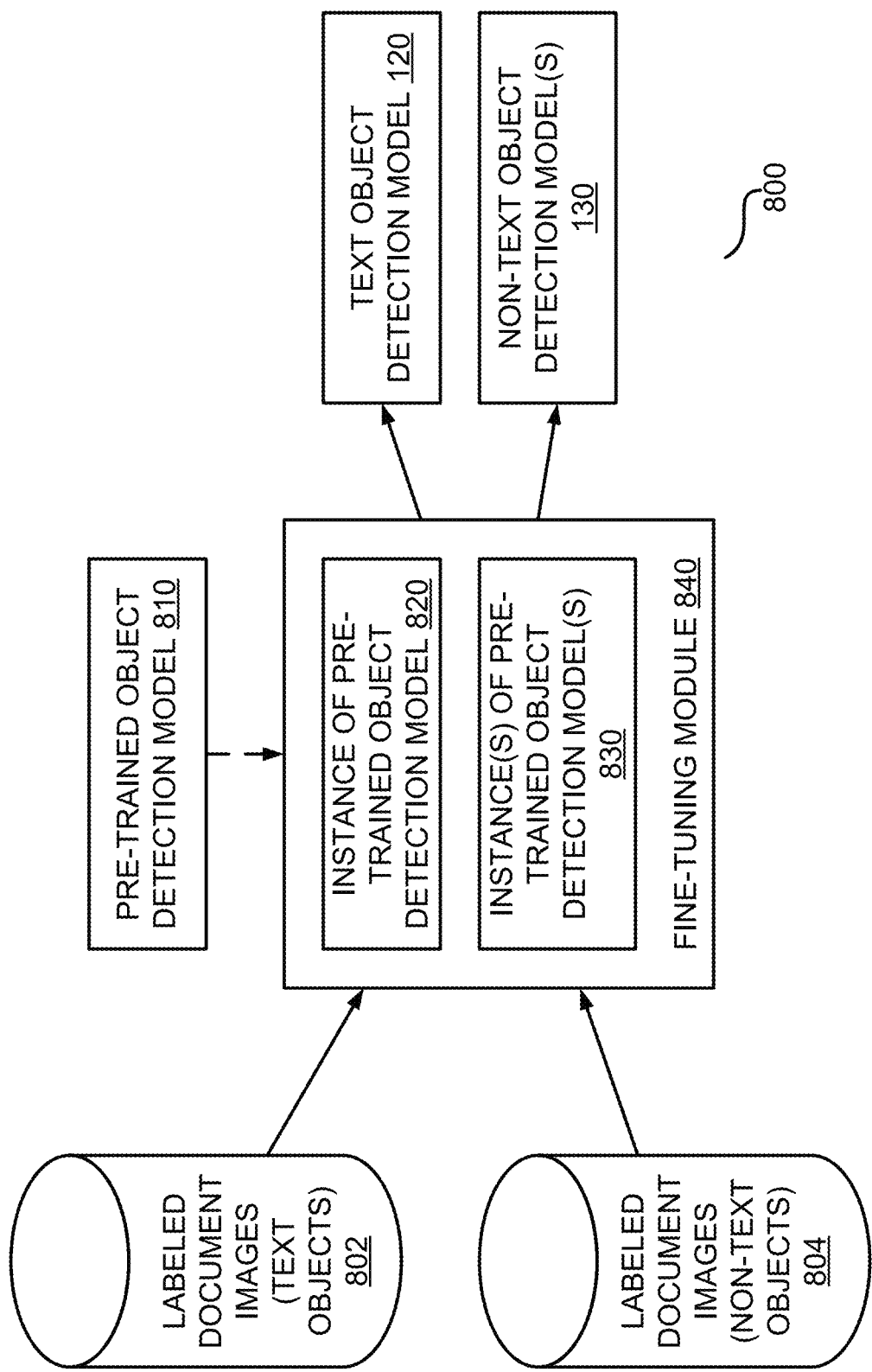
FIG. 8 shows a block diagram of a model training system, according to certain aspects of the present disclosure.

FIG. 8 is a block diagram of a model training system 800, according to certain aspects of the present disclosure. In this example, a fine-tuning module 840 is configured to generate the text object detection model 120 by fine-tuning a first instance 820 of a pre-trained object detection model 810, using a set 802 of labeled document images in which text objects are labeled, and to generate the at least one non-text object detection model 130 by fine-tuning at least a second instance 830 of the pre-trained object detection model 810, using a set 804 of labeled document images in which non-text objects are labeled. In another example, the at least one non-text object detection model 130 includes a first non-text object detection model (e.g., a signature object detection model 132 as described herein) and a second non-text object detection model (e.g., a checkbox object detection model 134 as described herein), and the fine-tuning module 840 is configured to generate these object detection models by fine-tuning respective instances of the pre-trained object detection model 810.

Figure 9:
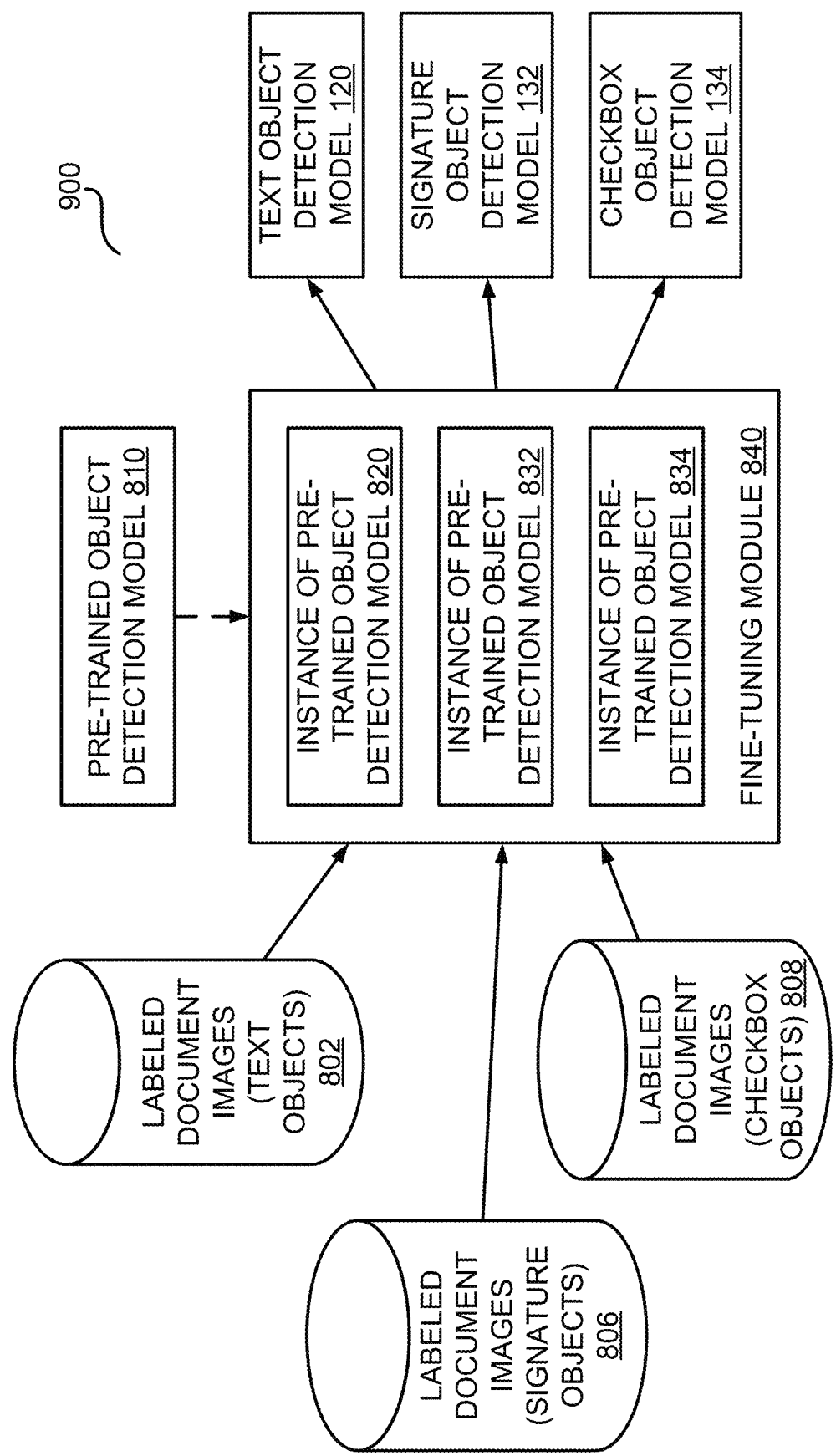
FIG. 9 shows a block diagram of another implementation of the model training system, according to certain aspects of the present disclosure.

FIG. 9 shows a further example of an implementation 900 of model training system 800 in which the fine-tuning module 840 is configured to generate each of the text object detection model 120, a first non-text object detection model (e.g., a signature object detection model 132), and a second non-text object detection model (e.g., a checkbox object detection model 134) by fine-tuning a respective instance 820, 832, 834 of the pre-trained object detection model 810, using a corresponding one of sets 802, 806, and 808 of labeled document images in which text objects, signature objects, and checkbox objects, respectively, are labeled. The model training system 800 (e.g., the fine-tuning module 840) may be implemented as a part of the document entity extraction system 100 or may be implemented separately.

The pre-trained object detection model 810 includes a pre-trained deep neural network (DNN), such as a deep convolutional neural network (CNN). In one example, the pre-trained object detection model 810 is based on a region proposal algorithm (e.g., a model based on an algorithm such as R-CNN, Fast R-CNN model, etc.) or includes a region proposal network (e.g., a model based on an algorithm such as Faster R-CNN, Mask R-CNN, etc.). In another example, the pre-trained object detection model 810 includes a feature pyramid network (e.g., an implementation of an EfficientDet model) or a model zoo (e.g., a model implemented using modules from the detectron2 platform (Facebook AI Research)) In another example, the pre-trained object detection model 810 includes a one-shot detector (e.g., a model according to any of versions 1-5 of YOLO (You Only Look Once), PP-YOLO, or Single Shot Detector (SSD), etc.).

The pre-trained object detection model 810 may be pre-trained on images from a dataset for object class recognition, such as a Pascal Visual Object Classes (VOC) dataset (available online Mar. 9, 2022 from host.robots.ox.ac.uk/pascal/VOC/) or the Common Objects in Context (COCO) dataset (available online Mar. 9, 2022 from cocodataset.org). Alternatively or additionally, the pre-trained object detection model 810 may be pre-trained on images from a document dataset, such as the Ryerson Vision Lab Complex Document Information Processing (RVL-CDIP) dataset (available online Mar. 9, 2022 from www.cs.cmu.edu/~aharley/rvl-cdip/) or the IIT CDIP 1.0 (Illinois Institute of Technology Complex Document Information Processing Test Collection, version 1.0) dataset (available online Mar. 9, 2022 from ir.nist.gov/cdip/).

The fine-tuning module 840 may be configured to fine-tune the instances (e.g., 820, 830) of the pre-trained object detection model 810 by further training some or all of the parameters of each model instance in a supervised training process. For example, the fine-tuning module 840 may be configured to further train some or all of the parameters of each model instance using labels of one or more sets of labeled document images as ground truth.

The labeled document images may be manually labeled. For example, the labeled document images may be prepared (e.g., by one or more human labelers) by labeling each document image of a training set of document images (which may be drawn from a dataset as mentioned above) with one or more bounding boxes, each bounding box indicating a boundary of a corresponding region of interest within the document image. The label may include information sufficient to identify the two-dimensional (2D) coordinates of the four corners of the bounding box within the document image, such as the 2D coordinates of one corner (e.g., the upper-left corner) and the width and height of the bounding box (e.g., in pixels), or the 2D coordinates of two opposite corners of the bounding box (e.g., the upper-left and lower-right corners), etc.

Figure 10:
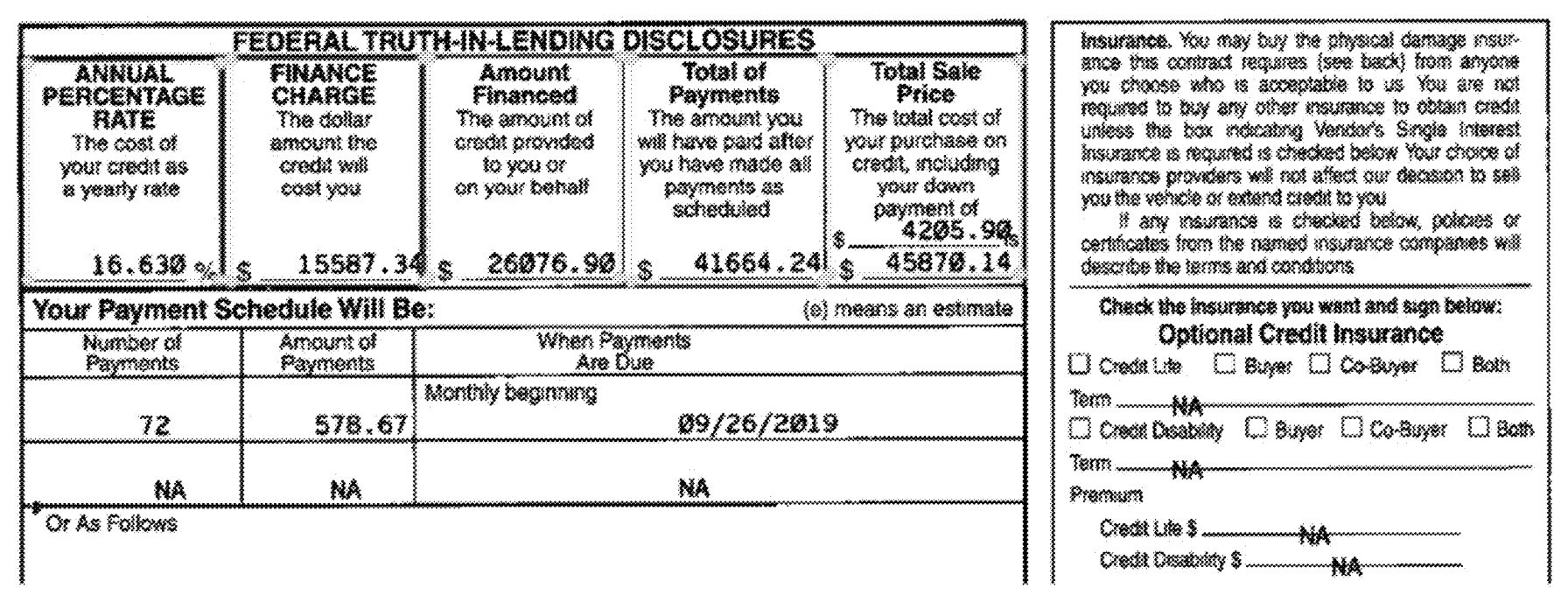

FIGS. 10, 11, and 12A-C show examples of portions of labeled document images as discussed above in which the bounding boxes of various text objects and non-text objects are shown. In these examples, each bounding box is outlined, and the four corners of each bounding box are indicated by dots. FIG. 10 shows an example in which five text regions are labeled, and FIG. 11 shows an example in which four signature regions are labeled. (Although personal identifying information has been redacted from FIG. 11, it will be understood that such information would be present in the labeled document images.) FIGS. 12A and 12B each show examples in which a checkbox region is labeled, and FIG. 12C shows an example in which two checkbox regions are labeled. As shown in the examples of FIGS. 12A-C, the check mark for a checkbox may be typed or handwritten and may be partially or even completely outside the checkbox.

In the example of FIG. 8, the fine-tuning module 840 is configured to fine-tune the first instance 820 of the pre-trained object detection model 810, using a set 802 of document images that are each labeled with the bounding box(es) of one or more text objects within the document image, to generate the fine-tuned text object detection model 120. In the example of FIG. 8, the fine-tuning module 840 is also configured to fine-tune the at least second instance 830 of the pre-trained object detection model 810, using a set 804 of document images that are each labeled with the bounding box(es) of one or more non-text objects within the document image, to generate the fine-tuned non-text object detection model(s) 130.

In the example of FIG. 9, the fine-tuning module 840 is configured to fine-tune the first instance 820 of the pre-trained object detection model 810, using a set 802 of document images that are each labeled with the bounding box(es) of one or more text objects within the document image, to generate the fine-tuned text object detection model 120. In the example of FIG. 9, the fine-tuning module 840 is also configured to fine-tune a second instance 832 of the pre-trained object detection model 810, using a set 806 of document images that are each labeled with the bounding box(es) of one or more signature objects within the document image, to generate the fine-tuned signature object detection model 132. In the example of FIG. 9, the fine-tuning module 840 is further configured to fine-tune a third instance 834 of the pre-trained object detection model 810, using a set 808 of document images that are each labeled with the bounding box(es) of one or more checkbox objects within the document image, to generate the fine-tuned checkbox object detection model 134.

As noted above, a labeled document image may have more than one region of interest of a particular class. The label of each of the labeled document images (e.g., as manually labeled) may also indicate, for each region of interest that is indicated by a corresponding bounding box, a class name of the region of interest (e.g., home address, amount, signature, checkbox, etc.). In this case, the fine-tuning module 340 may be configured to fine-tune each instance of the pre-trained object detection model 810 using the labeled document images which have labels indicating the class(es) that the resulting fine-tuned object detection model is to detect. FIG. 13 shows an example of an implementation 1300 of model training system 800 in which a set 801 of labeled document images is provided. In this example, the labels of the labeled document images of the set 801 include labels indicating regions of interest of different classes, and the fine-tuning module 840 is configured to fine-tune each instance 820, 830 of the pre-trained object detection model 810 using labeled document images from the set 801 which have labels indicating the class(es) that the corresponding resulting object detection model 120, 130 is to detect.

A method of producing object detection models may include fine-tuning, based on a first plurality of labeled document images, a first instance of a pre-trained object detection model to generate a text object detection model; and fine-tuning, based on a second plurality of labeled document images, a second instance of a pre-trained object detection model to generate a non-text object detection model (e.g., as described above with reference to the fine-tuning module 840). In this method, each of the first plurality of labeled document images is labeled with at least one bounding box that indicates a boundary of a text object, and each of the second plurality of annotated document images is labeled with at least one bounding box that indicates a boundary of a non-text object. The method may further include training a deep CNN to generate the pre-trained object detection model. One or more processing devices (e.g., one or more computing devices) may implement the operations of such a method of producing object detection models by executing suitable program code. For example, such a method may be executed by an instance of the fine-tuning module 840. Other implementations, however, are possible.

Figure 14:
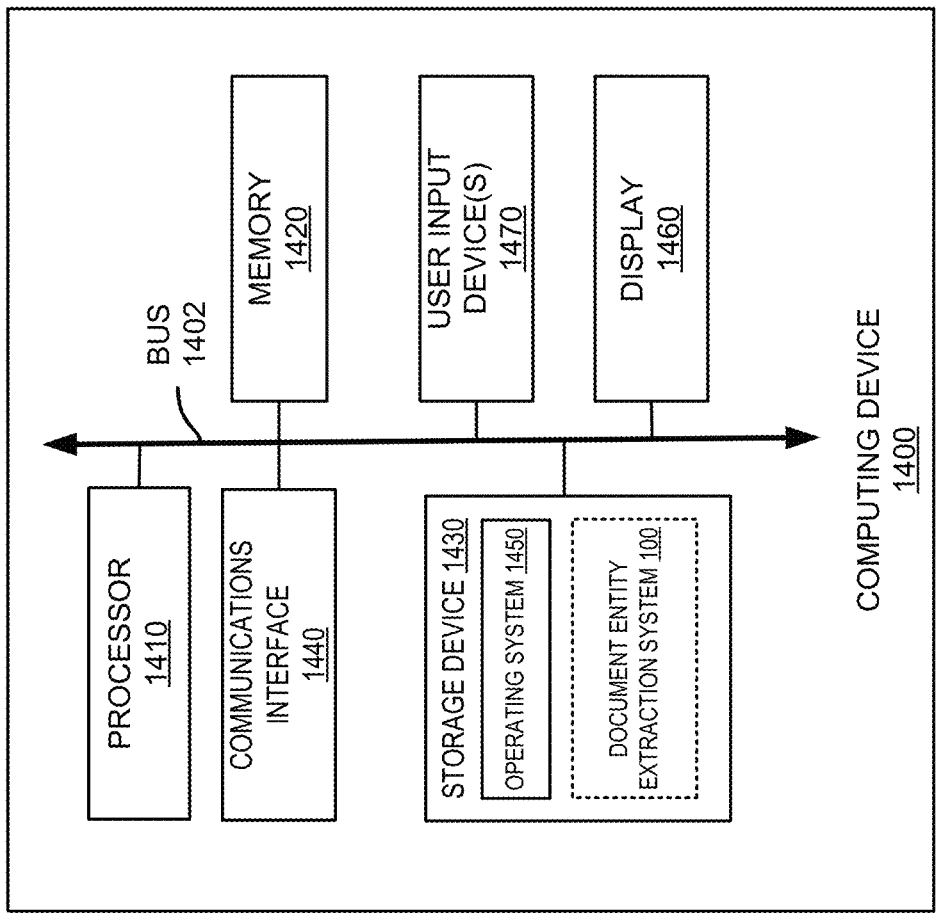
FIG. 14 shows a block diagram of an example computing device, according to certain aspects of the present disclosure.

FIG. 14 shows an example computing device 1400 suitable for implementing aspects of the techniques and technologies presented herein. The example computing device 1400 includes a processor 1410 which is in communication with a memory 1420 and other components of the computing device 1400 using one or more communications buses 1402. The processor 1410 is configured to execute processor-executable instructions stored in the memory 1420 to perform secure data protection and recovery according to different examples, such as part or all of the example process 700 or other processes described above with respect to FIGS. 1-13. In an example, the memory 1420 is a non-transitory computer-readable medium that is capable of storing the processor-executable instructions. The computing device 1400, in this example, also includes one or more user input devices 1470, such as a keyboard, mouse, touchscreen, microphone, etc., to accept user input. The computing device 1400 also includes a display 1460 to provide visual output to a user. In other examples of a computing device (e.g., a device within a cloud computing system), such user interface devices may be absent.

The computing device 1400 can also include or be connected to one or more storage devices 1430 that provides non-volatile storage for the computing device 1400. The storage devices 1430 can store an operating system 1450 utilized to control the operation of the computing device 1400. The storage devices 1430 can also store other system or application programs and data utilized by the computing device 1400, such as modules implementing the functionalities provided by the entity extraction system 100 or any other functionalities described above with respect to FIGS. 1-13. The storage devices 1430 might also store other programs and data not specifically identified herein.

The computing device 1400 can include a communications interface 1440. In some examples, the communications interface 1440 may enable communications using one or more networks, including: a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include Internet Protocol ("IP"), Transmission Control Protocol ("TCP"), User Datagram Protocol ("UDP"), or combinations thereof, such as TCP/IP or UDP/IP.

As discussed above, achieving accurate and reliable extraction of entities from unstructured digital data (e.g., scanned documents) remains a challenging problem. Most traditional methods of entity extraction are based only on optical character recognition (OCR) and lack the capability to handle document features such as non-text items (e.g., signatures, checkboxes, stamples, figures, etc.) or complex text groups. An OCR-based method may fail to capture semantic information represented by the structure of a text layout (e.g., a table), for example. Techniques for the effective use of text, visual, non-text items and layout information are currently subjects of open and challenging research.

Further approaches to document image processing as described below use special tokens to deal with non-text semantic items and may also use complex text group items for document understanding. Such techniques may be performed using a novel architecture, which may include a multimodal fusion transformer model (e.g., fusing information from text, visual, and position modalities) that is trained to process inputs that include embeddings of special tokens. Training of such an architecture may include multiple steps, such as the following: 1) build and train a special token model to detect signature items, checkbox items, stample items, and text region items; 2) pre-train a multimodal fusion transformer model (e.g., masked visual-language modeling); 3) fine-tune the trained fusion model for downstream task(s) (e.g., entity extraction, document classification, visual question answering).

Figure 15:
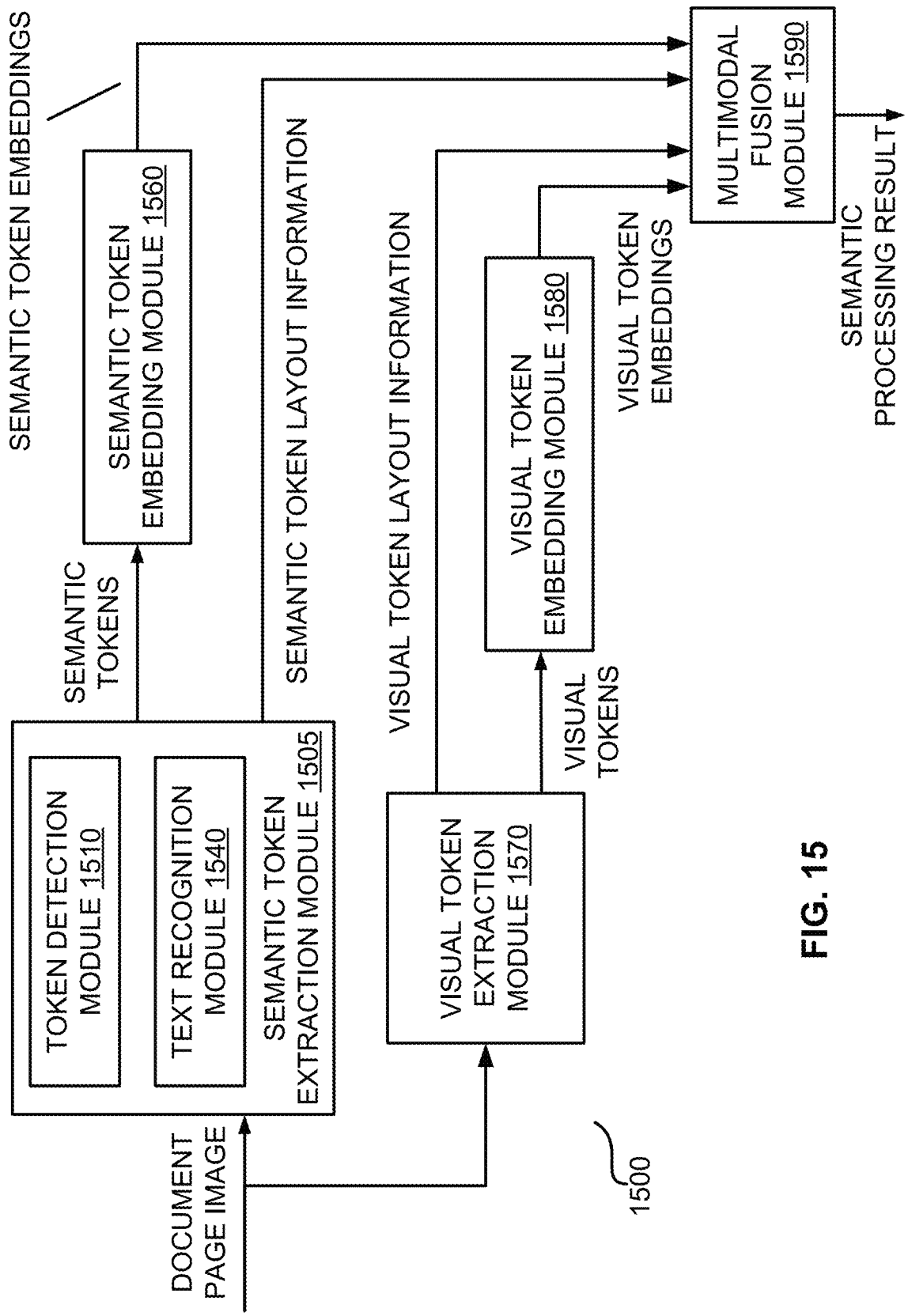
FIG. 15 shows a block diagram of an document image processing system according to certain aspects of the present disclosure.

FIG. 15 shows a block diagram of a document image processing system 1500, according to certain aspects of the present disclosure. As shown in FIG. 15, the document image processing system 1500 includes a semantic token extraction module 1505, a semantic token embedding module 1560, a visual token extraction module 1570, a visual token embedding module 1580, and a multimodal fusion module 1590. Based on at least one input document page image that depicts a page of a document, the semantic token extraction module 1505 generates a plurality of semantic tokens that includes a plurality of word tokens and a plurality of special tokens. The semantic token embedding module 1560 generates, for each of the semantic tokens, a corresponding semantic token embedding. The visual token extraction module 1570 processes the (at least one) document page image to extract visual tokens, and the visual token embedding module 1580 generates, for each of the visual tokens, a corresponding visual token embedding. The multimodal fusion module 1590 applies a trained model to process an input that is based on the plurality of semantic token embeddings and the plurality of visual token embeddings to generate a semantic processing result that includes at least one of the following: a predicted location for each of a plurality of entities in the document page image, a predicted document type of a document page depicted in the document page image, or a predicted answer to a question about the document page depicted in the document page image.

The system 1500 may include a conversion module (not shown) that is configured to convert digital documents in a document file format (e.g., PDF) into document images in an image file format (e.g., TIFF). For example, the conversion module may be configured to convert each page of a digital document into a corresponding page image. Document images that have been obtained by scanning or otherwise digitizing the pages of documents may already be in an image file format.

The system 1500 may include a pre-processing module (not shown) that is configured to pre-process document images for input to the system 1500. Pre-processing of the image files may include, for example, any of the following operations: de-noising (e.g., Gaussian smoothing), affine transformation (e.g., de-skewing, translation, rotation, and/or scaling), perspective transformation (e.g., warping), normalization (e.g., mean image subtraction), histogram equalization. Pre-processing may include, for example, scaling the document images to a uniform size. In some cases, the semantic token extraction module 1505 may be configured to accept input images of a particular size (e.g., 640 pixels wide×480 pixels high, 850 pixels wide×1100 pixels high, 1275 pixels wide×1650 pixels high, etc.).

Based on at least one input document page image that depicts a corresponding page of a document, the semantic token extraction module 1505 generates a plurality of semantic tokens that includes a plurality of word tokens and a plurality of special tokens. Each semantic token is a sequence of characters (also called a string) that represents a semantic element of the document. A semantic token may be a word token or a special token. A word token is a word or other textual semantic element of the document. A special token is a string that represents a non-textual semantic element of the document image.

Figure 16A:
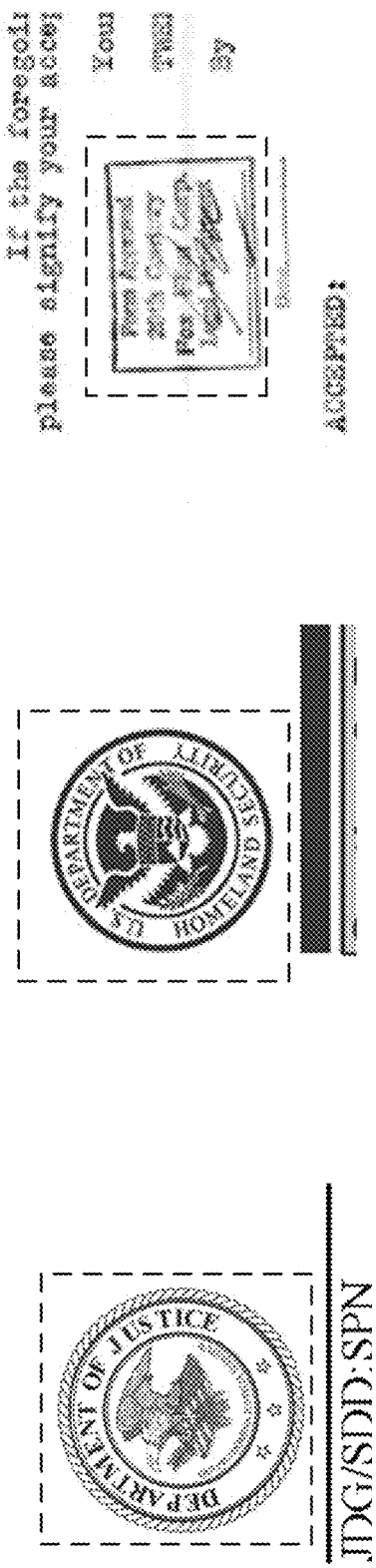
FIG. 16A shows examples of stample elements, according to certain aspects of the present disclosure.
Figure 16B:
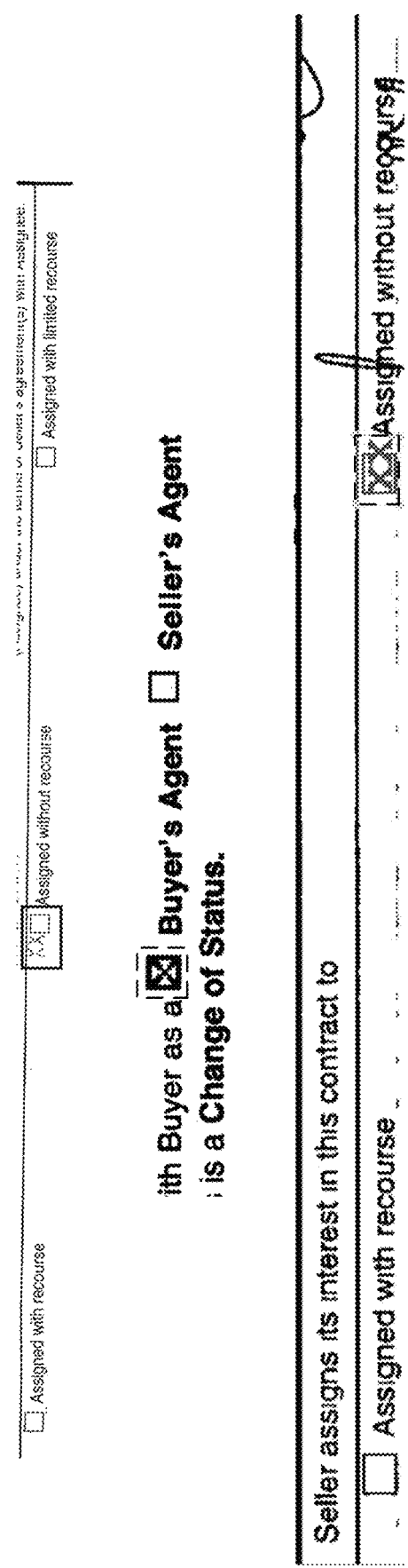
FIG. 16B shows examples of checkbox elements, according to certain aspects of the present disclosure.
Figure 17B:
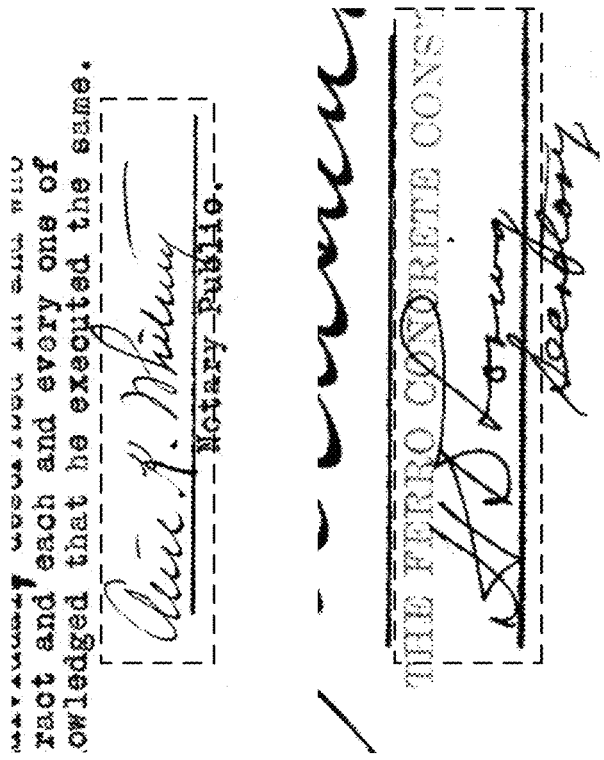
FIG. 17B shows examples of signature elements, according to certain aspects of the present disclosure.
Figure 17A:
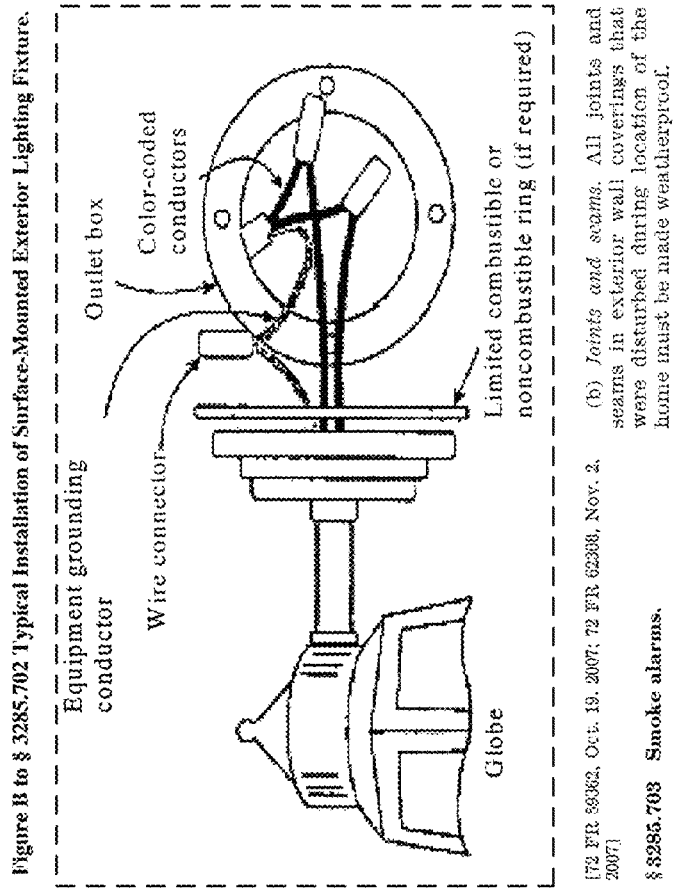
FIG. 17A shows an example of a figure element, according to certain aspects of the present disclosure.

Examples of non-textual semantic elements may include checkboxes, signatures, figures, or stamples. In one example, the token '_c_' represents a checkbox element, the token '_sg_' represents a signature element, and the string '_st_' represents a stample element. FIG. 16A shows three examples of stample elements (as indicated by the dotted boxes). FIG. 16B shows three examples of checkbox elements (as indicated by the dotted or solid boxes). FIG. 17A shows an example of a figure elements (as indicated by the dotted box). FIG. 17B shows two examples of signature elements (as indicated by the dotted boxes).

The semantic token extraction module 1505 also indicates corresponding positional information for each of the generated semantic tokens. Positional information for a semantic token may include one-dimensional (1D) position, such as the index of the token within a text sequence that includes the token. In the document page image portion shown in FIG. 18A, for example, the 1D positional information of the tokens in the text sequence {'seller', 'assigns', 'its', 'interest', 'in', 'this', 'contract'} may be indicated as '1', '2', '3', '4', '5', '6', and '7', respectively.

In one such example, the semantic tokens of the document image are modeled as a sequence of semantic tokens (e.g., in a raster (line-by-line) order), and the 1D positional information indicates an index of the semantic token within that sequence. In another example, the semantic tokens of the document image are grouped into segments (e.g., lines of text, paragraphs, blocks of text, tables, etc.), each of which may be modeled as a sequence of semantic tokens as described above, and the segments of the document image are modeled as a sequence of segments (e.g., in a raster order). In this case, the positional information for each semantic token may include the index of the semantic token within its corresponding segment and may also include 2D positional information, such as the index of the corresponding segment within the sequence of segments. In the document page image portion shown in FIG. 18A, for example, the segment index may be '1' for each token in the text sequence {'seller', 'assigns', 'its', 'interest', 'in', 'this', 'contract'}, the segment index may be '2' for each token in the text sequence {'assigned', 'with', 'recourse'}, and the segment index may be '3' for each token in the text sequence {'_c_', 'assigned', 'without', 'recourse'}. Other 2D (or 'layout') positional information for a semantic token may include 2D coordinates of a bounding box of the token (alternatively, 2D coordinates of a bounding box of the segment that includes the token).

As shown in FIG. 15, the semantic token extraction module 1505 may be implemented to include a token detection module 1510 and a text recognition module 1540. The token detection module 1510 detects a plurality of semantic tokens within the document image and predicts, for each of the detected semantic tokens, a token type of the token. In one non-limiting example, a token type of '0' indicates a word token, a token type of '1' indicates a checkbox token, a token type of '2' indicates a signature token, and a token type of '3' indicates a stample token.

For each detected special token, the token detection module 1510 also indicates positional information for the token (e.g., the 1D and 2D positional information as described above). The token detection module 1510 may also indicate positional information for each of the predicted word tokens (e.g., the 1D and 2D positional information as described above). Additionally or alternatively, the text recognition module 1540 may indicate positional information for each of the word tokens.

The token detection module 1510 may be implemented using a pre-trained token detection model, which may include, for example, a transformer model and/or a convolutional neural network (CNN) model. A transformer model includes a stack of layers having attention mechanisms, such as multi-head self-attention mechanisms (MHSA). The transformer model may be a vision transformer model, and examples of a vision transformer model that may be used are described in A. Dosovitskiy et al. "An Image is Worth 16×16 Words: Transformers for Image Recognition at Scale," arXiv:2010.11929v2. The vision transformer model may have a patchify stem or a convolutional stem.

The pre-trained model of the token detection module 1510 may be pre-trained on, e.g., the ImageNet-1K dataset or the ImageNet-21K dataset (available online at www.imagenet.org). Preparation of the token detection module 1510 may also include fine-tuning the pre-trained model to obtain a "special token detector." For example, the model may be fine-tuned using a training set of document page images in which at least non-textual semantic elements have been labeled (e.g., by human labelers). Preparation of such training document page images may include, for example, text region labeling, signature labeling, checkbox labeling, stample labeling, and/or figure labeling. Labeling of a semantic element within a document page image may include indicating token location (e.g., bounding box) and token type (e.g., class).

The text recognition module 1540 produces text strings from the document page image. For example, the text recognition module 1540 may produce a text string for each word token in the document page image. The text recognition module 1540 may be implemented using an OCR module and/or an application programming interface (API) (e.g., Google Tesseract, Microsoft Read API, etc.).

The text recognition module 1540 may also indicate positional information for each of the word tokens. For example, the text recognition module 1540 may indicate a 2D layout position (e.g., 2D coordinates of a corresponding bounding box) for each word token. Alternatively, the text recognition module 1540 may receive 2D coordinates of bounding boxes of word tokens (or of segments) from the token detection module 1510 and may produce corresponding text of the word tokens (e.g., by performing OCR on the image regions indicated by the bounding boxes). In either case, the text recognition module 1540 may also indicate 1D positional information (e.g., the index of the token within a sequence of semantic tokens that includes the token) and/or a segment index for each word token.

The semantic token embedding module 1560 generates, for each of the semantic tokens, a corresponding semantic token embedding. The information embedded in each semantic token embedding may include the content of the corresponding semantic token (e.g., textual content for a word token, token definition for a predicted special token ('_c_', '_sg_', '_st_')). The information embedded in each semantic token embedding may also include the token type of the corresponding semantic token (e.g., '0' for word, '1' for checkbox, '2' for signature, '3' for stample). The semantic token embedding module 1560 may be configured to translate a vector that represents such information of the semantic token into a lower-dimensional space.

The semantic token embedding module 1560 may be implemented to include a token embedding matrix (e.g., of a BERT or other language transformer model) that has been extended to handle special tokens. In one example, the semantic token embedding module 1560 is initialized using a pre-trained word embedding matrix, and the matrix is further trained (e.g., fine-tuned) to embed special tokens as well to produce the token embedding matrix.

The information included in each semantic token embedding may also include positional information of the corresponding semantic token. For example, the semantic token embedding module 1560 may add 1D positional information and possibly 2D positional information (e.g., segment index) of the token to the content embedding generated by the token embedding matrix to produce the corresponding semantic token embedding. Each positional embedding may have the same dimension as the content embeddings, such that the various embeddings for each semantic token can be combined by summation.

FIG. 18B shows examples of information to be embedded from the image portion of FIG. 18A, including the contents of the semantic tokens (as shown in the row labeled "token embedding"), the token types of the semantic tokens (as shown in the row labeled "type embedding"), and the raster-order sequence indices of the semantic tokens (as shown in the row labeled "1d pos embedding"). Each of these semantic tokens has a token type that indicates a word token (in this example, '0') except for the two checkbox tokens, which each have a token type that indicates a checkbox token (in this example, '1'). As shown in the first column, the first semantic token has the contents 'seller' and the token type '0'; as shown in the second column, the second semantic token has the contents 'assigns' and the token type '0'; and so on.

As noted above, the positional information of a semantic token may include 2D positional information that indicates a location of the token within the document image (also called "layout information"). 2D positional information of a semantic token may be included in the semantic token embedding and/or may be combined with (e.g., added to) the semantic token embedding in an input layer of the multi-modal fusion module 1590 (e.g., as described below). In either case, the module performing the layout embedding may include using embedding layers to embed (normalized) x-axis, y-axis, width and/or height features separately. As described above, such features may be indicated in a bounding box produced by the text recognition module 1540.

FIG. 18B shows examples of layout information to be embedded for each semantic token. In these examples, the maximum dimensions of the document image in each of the x and y directions are normalized to 1000, and the values in the rows labeled "2d pos embedding (x)" and "2d pos embedding (y)" indicate, at each column, the 2D information to be embedded for the corresponding semantic token (e.g., the x and y coordinates, respectively, of the upper-left corner of the bounding box of the semantic token). The examples shown in FIG. 18B use token-level layout positions, such that each semantic token has its own 2D position. Alternatively, segment-level layout positions may be used, such that the semantic tokens in a segment all have the same 2D position.

The visual token extraction module 1570 processes the at least one document page image to extract visual tokens. In one example, the visual token extraction module 1570 produces the visual tokens by dividing the document page image into a plurality of image patches (e.g., a grid of non-overlapping image patches). The image may be resized (e.g., to a size of 224×224 pixels) before it is divided into image patches. The image patches may be of uniform size and may be square.

In another example, the visual token extraction module 1570 produces the visual tokens by generating a feature map from the document page image. The visual token extraction module 1570 may use one or more convolutional layers (e.g., a CNN) to generate the feature map. The document page image may be resized (e.g., to a size of 224×224 pixels) before it is inputted to the convolutional layers, and the resulting feature map may be resized (e.g., by average-pooling). In this case, the visual token extraction module 1570 may obtain the visual tokens by flattening the feature map. For example, the visual token extraction module 1570 may be configured to flatten a feature map of height H×width W×depth F to obtain a sequence of length HW of visual tokens, where the length of each visual token in the sequence is F.

The visual token embedding module 1580 generates, for each of the visual tokens, a corresponding visual token embedding. The visual token embedding module 1580 may generate each visual token embedding by flattening the corresponding visual token. For example, the visual token extraction module 1570 may flatten the corresponding visual token into a vector (e.g., by concatenating the channels of all pixels or features in the visual token). The visual token embedding module 1580 may apply a trainable linear projection to each flattened visual token to align the dimensionality of the resulting visual token embeddings with that of the semantic token embeddings.

The visual token embedding module 1580 may generate each visual token embedding to include positional information as well. For example, the visual token embedding module 1580 may add a learnable 1D position embedding to each flattened visual token (e.g., after linear projection) to produce the corresponding visual token embedding. Each positional embedding may have the same dimension as the flattened visual tokens (e.g., after linear projection), such that the various embeddings for each visual token can be combined by summation.

The visual token embedding module 1580 may be implemented to include an image embedding portion of a vision transformer or multimodal transformer. For example, the visual token embedding module 1580 may be implemented to perform visual embedding as described in any of the following: A. Dosovitskiy et al. "An Image is Worth 16×16 Words: Transformers for Image Recognition at Scale," arXiv:2010.11929v2; T. Xiao et al, "Early Convolutions Help Transformers See Better," arXiv:2106.14881v3; Y. Xu et al, "LayoutLMv2: Multi-modal Pre-training for Visually-rich Document Understanding," arXiv:2012.14740v4; Y. Huang et al, "LayoutLMv3: Pre-training for Document AI with Unified Text and Image Masking," arXiv:2204.08387v3.

The multimodal fusion module 1590 applies a trained model to process an input that is based on the plurality of semantic token embeddings and the plurality of visual token embeddings to generate a semantic processing result that includes at least one of the following: a predicted location for each of a plurality of entities in the document page image, a predicted document type of a document page depicted in the document page image, or a predicted answer to a question about the document page depicted in the document page image.

Figure 19:
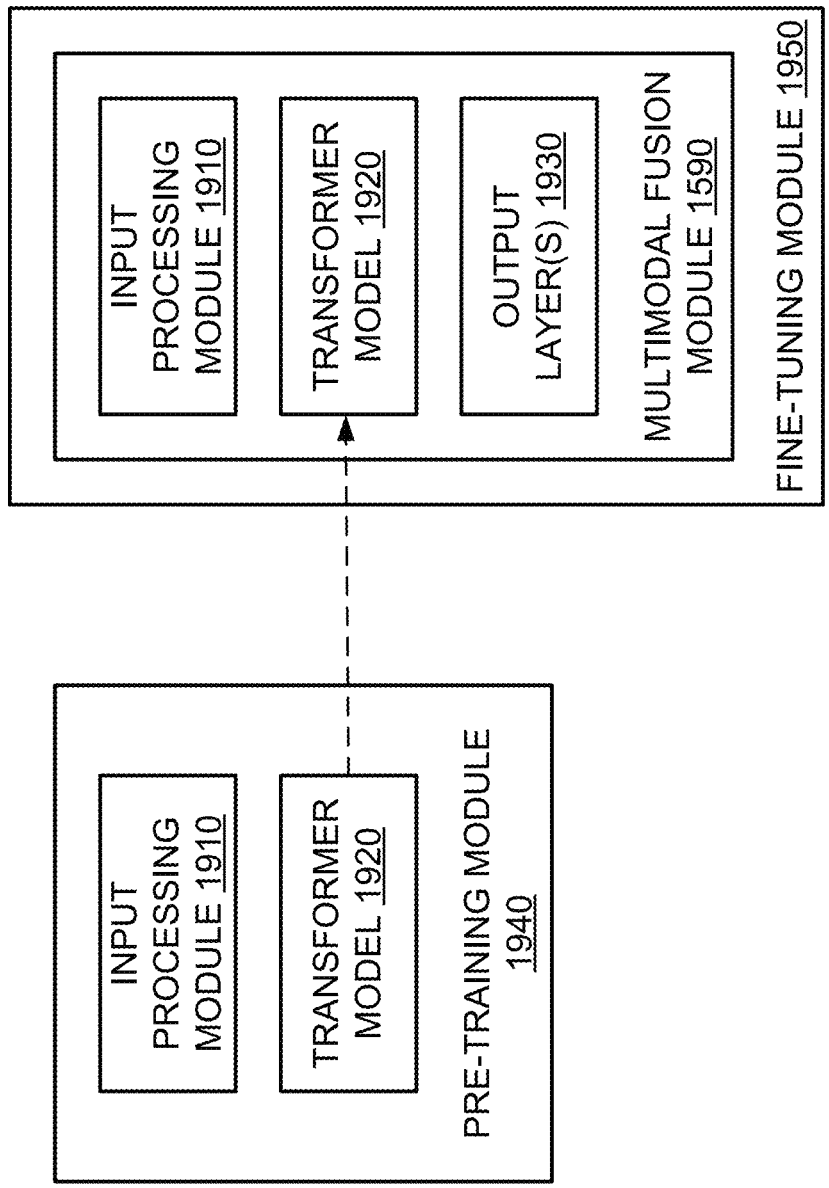
FIG. 19 shows a flowchart of a process of document image processing, according to certain aspects of the present disclosure.

As shown in FIG. 19, the multimodal fusion module may include an input processing module 1910, a transformer model 1920, and one or more output layers 1930. The input processing module 1910 may assemble the input to the trained model by concatenating the semantic token embeddings and the visual token embeddings. The input processing module 1910 may also embed the layout information (e.g., may include one or more embedding layers) and combine the layout embeddings with (e.g., add them to) the corresponding token embeddings. The input processing module 1910 may also perform other formatting of the input to the trained model, such as add learnable classification tokens [CLS] and/or end-of-sentence/end-of-segment tokens [SEP], implementing random masking of tokens during training, etc.

The transformer model 1920 includes at least one stack of layers having attention mechanisms, such as multi-head self-attention (MHSA) mechanisms. Examples of multimodal transformer models that may be used to implement the transformer model 1920 include those described in, for example, in any of the following: Y. Xu et al, "LayoutLMv2: Multi-modal Pre-training for Visually-rich Document Understanding," arXiv:2012.14740v4; Y. Huang et al, "LayoutLMv3: Pre-training for Document AI with Unified Text and Image Masking," arXiv:2204.08387v3.

The transformer model 1920 may be pre-trained as a multimodal fusion transformer model. As shown in FIG. 19, for example, a pre-training module 1940 may be used to pre-train the transformer model 1920 (e.g., within system 1500) to fuse information from the semantic token embeddings and information from the visual token embeddings to predict multimodal features of the document page image.

Pre-training of the transformer model 1920 may be self-supervised (e.g., an unsupervised learning without human labels). Such pre-training may use the semantic content (e.g., text) and visual cues from the text recognition module 1540 and the token detection module 1510 as the labels to train the model. Pre-training of the transformer model 1920 may include one or more (e.g., all) of the following phases:

1) masked language modeling (MLM): The pre-training module 1940 may perform MLM by randomly masking semantic tokens (e.g., word tokens and/or special tokens) in the training inputs and training the model to predict the masked tokens from their contexts (e.g., from neighbor tokens). The objective of an MLM pre-training operation may be to predict the original vocabulary ID of each masked semantic token based only on its context.

2) token-image match: The pre-training module 1940 may perform token-image matching by randomly masking language (e.g., word) tokens in the training inputs and training the model to predict the masked language tokens from the visual cues.

3) token type classification: The pre-training module 1940 may perform token type classification by randomly masking special tokens in the training inputs and training the model to predict the token types of the masked special tokens (e.g., signature, checkbox, stample, figure, etc.) from the visual cues.

The one or more output layers 1930 of the multimodal fusion module 1590 may be configured according to a desired downstream task. Such layers may include, for example, one or more of any of the following: a linear (e.g., fully connected) layer, a feed-forward neural network (e.g., multi-layer perceptron), a softmax layer. Training of the multimodal fusion module 1590 may also include a supervised fine-tuning phase that uses application-dependent labels (e.g., as provided by human labelers) to train the last layers of the model for downstream tasks. As shown in e, a fine-tuning module 1950 may be used to train the pre-trained transformer model 1920 and the output layer(s) 1930 (e.g., within system 1500) to perform a desired classification and/or regression task.

A first example of a downstream task is entity extraction (also called "named entity recognition"). In this case, the fine-tuning module 1950 may use entity locations in the training images as the labels to train the pre-trained transformer model 1920 and the output layer(s) 1930. The trained model may then predict target entity locations in document page images and use these locations to infer the entity values (e.g., from OCR results).

A second example of a downstream task is document classification. In this case, the fine-tuning module 1950 may use the document types (doctypes) of the training images as the labels to train the model. The trained model may then predict the document type for a document. For a classification task, the input processing module 1910 may be configured to add a learnable "classification token" to the input sequence of token embeddings.

A third example of a downstream task is visual question answering. In this case, the fine-tuning module 1950 may use natural-language question/answer pairs relating to the training images as the labels to train the model. Given a document image, the trained model may then predict the natural-language answer to a target natural-language question.

In an example, the processes of the document image processing system 1500 (which may include the processes of pre-training module 1940 and/or fine-tuning module 1950) may all be performed as microservices of a remote or cloud computing system, or may be implemented in one or more containerized applications on a distributed system (e.g., using a container orchestrator, such as Kubernetes). Alternatively, the processes of the document image processing system 1500 may be performed locally as modules running on a computing platform associated with the document image processing system 1500. In either case, such a system or platform may include multiple processing devices (e.g., multiple computing devices) that collectively perform the process. In some examples, the document image processing system 1500 may be accessed through a detection application programming interface (API). The detection API may be deployed as a gateway to a microservice or a Kubernetes system on which the processes of the document image processing system 1500 may be performed. The microservice or Kubernetes system may provide computing power to serve large scale document image processing operations.

Figure 20:
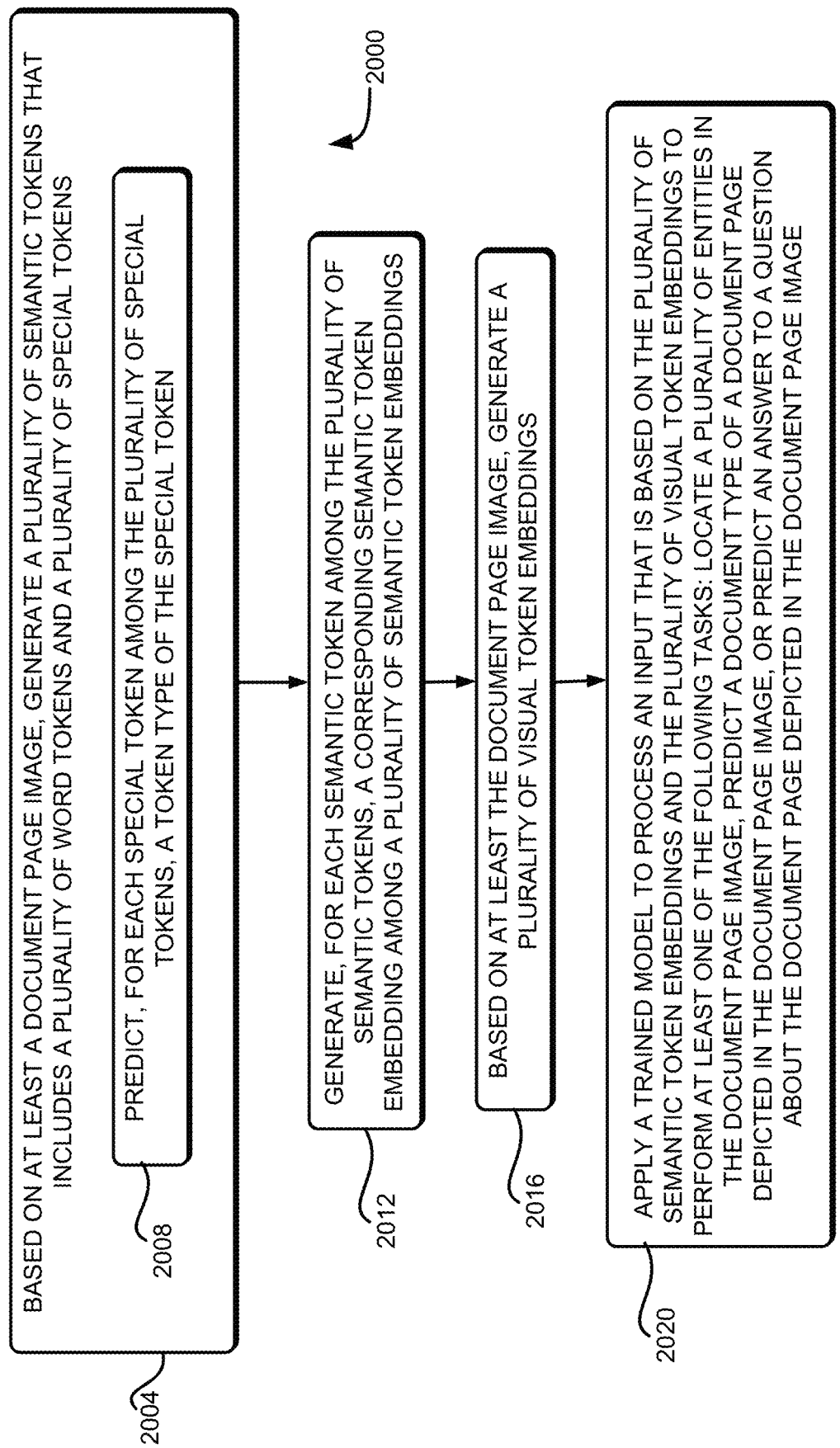
FIG. 20 shows a flowchart of a process of document image processing, according to certain aspects of the present disclosure.

FIG. 20 depicts an example of a process 2000 of document image processing, according to certain embodiments of the present disclosure. One or more processing devices (e.g., one or more computing devices) implement operations depicted in FIG. 20 by executing suitable program code. For example, process 2000 may be executed by an instance of the document image processing system 1500. For illustrative purposes, the process 2000 is described with reference to certain examples depicted in the figures. Other implementations, however, are possible.

At block 2004, the process of document image processing involves generating (e.g., by a region detection module as described herein), based on at least a document page image, a plurality of semantic tokens that includes a plurality of word tokens and a plurality of special tokens. In an example, the document page image is stored in a manner that enables access to the document page image by a system executing the process (e.g., the document image processing system 1500). For example, the document page image may be stored locally with the document image processing system, or the document image processing system may access the document image from a remote storage system (e.g., via a detection API).

Each special token among the plurality of special tokens represents a non-textual semantic element of the document image. Block 2004 includes sub-block 2008. At block 2008, generating the plurality of semantic tokens includes predicting, for each special token among the plurality of special tokens, a token type of the special token. For each of the plurality of special tokens, the token type of the special token may indicate at least one of a checkbox token, a signature token, a figure token, or a stample token. The plurality of special tokens may include at least two special tokens having different predicted token types. Generating the plurality of semantic tokens may also include predicting, for each word token among the plurality of semantic tokens, a token type of the word token.

At block 2012, the process of document image processing involves generating, for each semantic token among the plurality of semantic tokens, a corresponding semantic token embedding among a plurality of semantic token embeddings. Each semantic token embedding indicates a position of the corresponding semantic token within the document image, and each semantic token embedding that corresponds to a special token indicates the predicted token type of the corresponding special token.

At block 2016, the process of document image processing involves generating, based on at least the document page image, a plurality of visual token embeddings, wherein each visual token embedding indicates a position of a corresponding visual token within the document page image.

At block 2020, the process of document image processing involves applying a trained model to process an input that is based on the plurality of semantic token embeddings and the plurality of visual token embeddings to generate a semantic processing result. The semantic processing result includes at least one of the following: a predicted location for each of a plurality of entities in the document page image, a predicted document type of a document page depicted in the document page image, or a predicted answer to a question about the document page depicted in the document page image. The input may be an input vector that is based on a concatenation of the plurality of semantic token embeddings and the plurality of visual token embeddings, possibly combined with corresponding layout embeddings.

Figure 21:
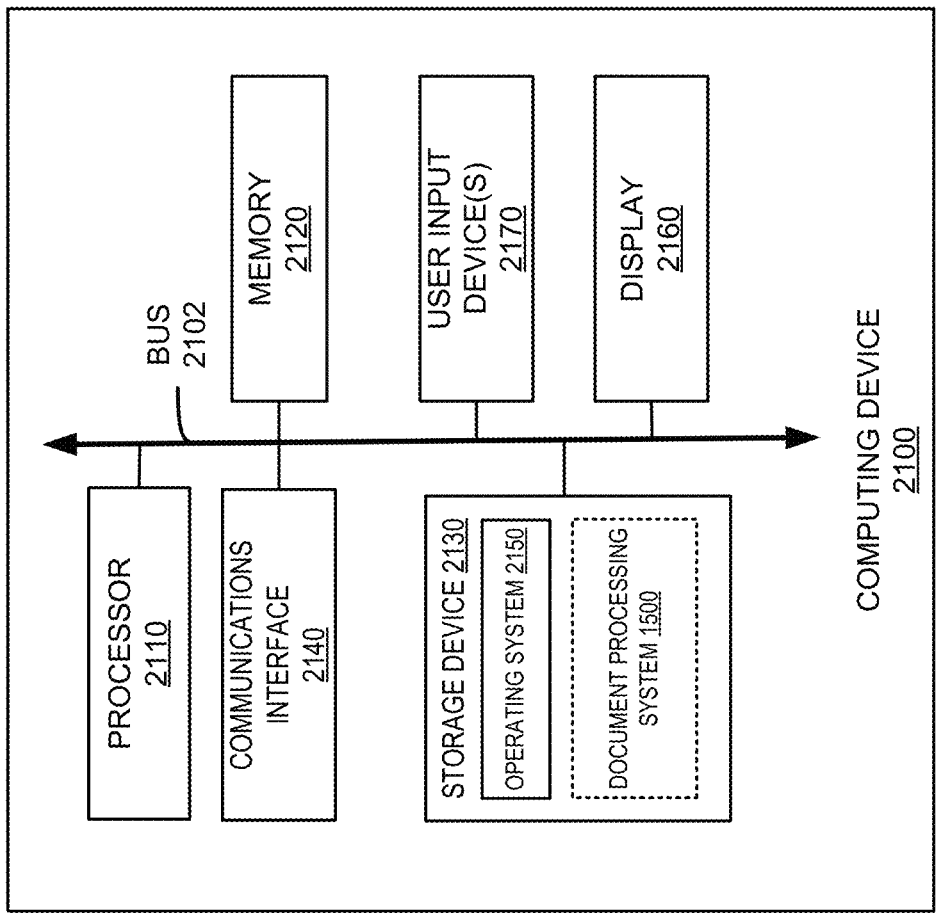
FIG. 21 shows a block diagram of an example computing device, according to certain aspects of the present disclosure.

FIG. 21 shows an example computing device 2100 suitable for implementing aspects of the techniques and technologies presented herein. The example computing device 2100 includes a processor 2110 which is in communication with a memory 2120 and other components of the computing device 2100 using one or more communications buses 2102. The processor 2110 is configured to execute processor-executable instructions stored in the memory 2120 to perform secure data protection and recovery according to different examples, such as part or all of the example process 700 or other processes described above with respect to FIGS. 15-20. In an example, the memory 2120 is a non-transitory computer-readable medium that is capable of storing the processor-executable instructions. The computing device 2100, in this example, also includes one or more user input devices 2170, such as a keyboard, mouse, touchscreen, microphone, etc., to accept user input. The computing device 2100 also includes a display 2160 to provide visual output to a user. In other examples of a computing device (e.g., a device within a cloud computing system), such user interface devices may be absent.

The computing device 2100 can also include or be connected to one or more storage devices 2130 that provides non-volatile storage for the computing device 2100. The storage devices 2130 can store an operating system 2150 utilized to control the operation of the computing device 2100. The storage devices 2130 can also store other system or application programs and data utilized by the computing device 2100, such as modules implementing the functionalities provided by the entity extraction system 100 or any other functionalities described above with respect to FIGS. 15-20. The storage devices 2130 might also store other programs and data not specifically identified herein.

The computing device 2100 can include a communications interface 2140. In some examples, the communications interface 2140 may enable communications using one or more networks, including: a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate arrays (FPGAs) specifically, to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media (for example, computer-readable storage media) that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

In the following sections, further exemplary embodiments are provided.

Example 1 includes a computer-implemented method of entity extraction, the method comprising: processing a plurality of document images to detect a plurality of regions of interest that includes a plurality of text objects and a plurality of non-text objects; producing, based on a corresponding region of interest among the plurality of regions of interest, each of a plurality of text strings; and processing the plurality of text strings to identify a plurality of entities, wherein each of the plurality of entities is associated with a corresponding region of interest among the plurality of regions of interest, wherein processing the plurality of document images includes: applying a text object detection model to the plurality of document images to detect the plurality of text objects; and applying at least one non-text object detection model to the plurality of document images to detect the plurality of non-text objects, and wherein, prior to processing the plurality of document images, at least two object detection models among the text object detection model and the at least one non-text object detection model were generated by fine-tuning respective instances of a pre-trained object detection model.

Example 2 includes the computer-implemented method of Example 1 or some other example herein, wherein: the text object detection model was generated by fine-tuning a first instance of the pre-trained object detection model, and the at least one non-text object detection model was generated by fine-tuning at least a second instance of the pre-trained object detection model.

Example 3 includes the computer-implemented method of Example 1 or some other example herein, wherein the at least one non-text object detection model includes a signature object detection model and a checkbox object detection model.

Example 4 includes the computer-implemented method of Example 3 or some other example herein, wherein: the signature object detection model was generated by fine-tuning a first instance of the pre-trained object detection model, and the checkbox object detection model was generated by fine-tuning a second instance of the pre-trained object detection model.

Example 5 includes the computer-implemented method of Example 3 or some other example herein, wherein: the text object detection model was generated by fine-tuning a first instance of the pre-trained object detection model, the signature object detection model was generated by fine-tuning a second instance of the pre-trained object detection model, and the checkbox object detection model was generated by fine-tuning a third instance of the pre-trained object detection model.

Example 6 includes the computer-implemented method of Example 1 or some other example herein, wherein each of the plurality of regions of interest is a region of a corresponding document image among the plurality of document images, and wherein processing the plurality of document images to detect the plurality of regions of interest includes indicating, for each of the plurality of regions of interest: a bounding box that indicates a boundary of the region of interest within the corresponding document image, and a class label that indicates a class of the region of interest, and wherein: for at least some of the plurality of text objects, the class of the text object is a first class, and for each of the plurality of non-text objects, the class of the non-text object is different than the first class.

Example 7 includes the computer-implemented method of Example 1 or some other example herein, wherein each of the plurality of regions of interest is a region of a corresponding document image among the plurality of document images, and wherein, for each of the plurality of regions of interest, producing the corresponding text string is based on a class of the region of interest and on a bounding box that indicates a boundary of the region of interest within the corresponding document image, and wherein: for at least some of the plurality of text objects, the class of the text object is a first class, and for each of the plurality of non-text objects, the class of the non-text object is different than the first class.

Example 8 includes the computer-implemented method of Example 1 or some other example herein, wherein: each of the plurality of regions of interest is a region of a corresponding document image among the plurality of document images; for each of the plurality of text objects, producing the corresponding text string includes obtaining the text string from the text object, and for each of the plurality of non-text objects, producing the corresponding text string includes obtaining the text string from a neighbor region of the non-text object within the corresponding document image, wherein a shape of the neighbor region relative to the non-text object is based on a class of the non-text object.

Example 9 includes the computer-implemented method of Example 8 or some other example herein, wherein for each of the plurality of non-text objects, obtaining the corresponding text string comprises performing optical character recognition (OCR) on the neighbor region of the non-text object.

Example 10 includes the computer-implemented method of Example 1 or some other example herein, wherein processing the plurality of text strings includes, for each of the plurality of non-text objects: selecting, based on a class of the non-text object, a dictionary from among a plurality of dictionaries; and identifying, based on the corresponding text string and the dictionary, an entity associated with the non-text object.

Example 11 includes an entity extraction system, the system comprising: one or more processing devices; and one or more non-transitory computer-readable media communicatively coupled to the one or more processing devices, wherein the one or more processing devices are configured to execute the program code stored in the non-transitory computer-readable media and thereby perform operations comprising: processing a plurality of document images to detect a plurality of regions of interest that includes a plurality of text objects and a plurality of non-text objects; producing, based on a corresponding region of interest among the plurality of regions of interest, each of a plurality of text strings; and processing the plurality of text strings to identify a plurality of entities, wherein each of the plurality of entities is associated with a corresponding region of interest among the plurality of regions of interest, wherein processing the plurality of document images includes: applying a text object detection model to the plurality of document images to detect the plurality of text objects; and applying at least one non-text object detection model to the plurality of document images to detect the plurality of non-text objects, and wherein, prior to processing the plurality of document images, at least two object detection models among the text object detection model and the at least one non-text object detection model were generated by fine-tuning respective instances of a pre-trained object detection model.

Example 12 includes the entity extraction system of Example 11 or some other example herein, wherein: the text object detection model was generated by fine-tuning a first instance of the pre-trained object detection model, and the at least one non-text object detection model was generated by fine-tuning at least a second instance of the pre-trained object detection model.

Example 13 includes the entity extraction system of Example 11 or some other example herein, wherein the at least one non-text object detection model includes a signature object detection model and a checkbox object detection model.

Example 14 includes the entity extraction system of Example 13 or some other example herein, wherein: the signature object detection model was generated by fine-tuning a first instance of the pre-trained object detection model, and the checkbox object detection model was generated by fine-tuning a second instance of the pre-trained object detection model.

Example 15 includes the entity extraction system of Example 13 or some other example herein, wherein: the text object detection model was generated by fine-tuning a first instance of the pre-trained object detection model, the signature object detection model was generated by fine-tuning a second instance of the pre-trained object detection model, and the checkbox object detection model was generated by fine-tuning a third instance of the pre-trained object detection model.

Example 16 includes the entity extraction system of Example 11 or some other example herein, wherein each of the plurality of regions of interest is a region of a corresponding document image among the plurality of document images, and wherein processing the plurality of document images to detect the plurality of regions of interest includes indicating, for each of the plurality of regions of interest: a bounding box that indicates a boundary of the region of interest within the corresponding document image, and a class label that indicates a class of the region of interest, and wherein: for at least some of the plurality of text objects, the class of the text object is a first class, and for each of the plurality of non-text objects, the class of the non-text object is different than the first class.

Example 17 includes the entity extraction system of Example 11 or some other example herein, wherein each of the plurality of regions of interest is a region of a corresponding document image among the plurality of document images, and wherein, for each of the plurality of regions of interest, producing the corresponding text string is based on a class of the region of interest and on a bounding box that indicates a boundary of the region of interest within the corresponding document image, and wherein: for at least some of the plurality of text objects, the class of the text object is a first class, and for each of the plurality of non-text objects, the class of the non-text object is different than the first class.

Example 18 includes the entity extraction system of Example 11 or some other example herein, wherein: each of the plurality of regions of interest is a region of a corresponding document image among the plurality of document images; for each of the plurality of text objects, producing the corresponding text string includes obtaining the text string from the text object, and for each of the plurality of non-text objects, producing the corresponding text string includes obtaining the text string from a neighbor region of the non-text object within the corresponding document image, wherein a shape of the neighbor region relative to the non-text object is based on a class of the non-text object.

Example 19 includes the entity extraction system of Example 11 or some other example herein, wherein processing the plurality of text strings includes, for each of the plurality of non-text objects: selecting, based on a class of the non-text object, a dictionary from among a plurality of dictionaries; and identifying, based on the corresponding text string and the dictionary, an entity associated with the non-text object.

Example 20 includes one or more non-transitory computer-readable media storing computer-executable instructions to cause a computer to perform the computer-implemented method of Example 1 or some other example herein.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C. For the purposes of the present document, the phrase "A is based on B" means "A is based on at least B".

Different arrangements of the components depicted in the drawings or described above, as well as components and steps not shown or described are possible. Similarly, some features and sub-combinations are useful and may be employed without reference to other features and sub-combinations. Embodiments of the presently subject matter have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

The invention claimed is:

1. A computer-implemented method of document image processing, the method comprising:
   based on at least a document page image, generating a plurality of semantic tokens that includes a plurality of word tokens and a plurality of special tokens, wherein:
   each special token among the plurality of special tokens represents a non-textual semantic element of the document page image, and
   generating the plurality of semantic tokens includes predicting, for each special token among the plurality of special tokens, a token type of the special token;
   generating, for each semantic token among the plurality of semantic tokens, a corresponding semantic token embedding among a plurality of semantic token embeddings, wherein each semantic token embedding that corresponds to a special token indicates the predicted token type of the corresponding special token, and wherein each semantic token embedding comprises:
   a one-dimensional (1D) positional embedding indicating a position of the semantic token within a sequence of semantic tokens among the plurality of semantic tokens within the document page image, and
   a two-dimensional (2D) positional embedding indicating a spatial layout position of the corresponding semantic token within the document page image;
   based on at least the document page image, generating a plurality of visual token embeddings, wherein each visual token embedding indicates a position of a corresponding visual token within the document page image; and
   applying a trained multimodal fusion model comprising attention mechanisms to process an input that is based on the plurality of semantic token embeddings, including respective 1D positional embeddings indicating sequential text order positions and respective 2D positional embeddings indicating spatial layout positions and the plurality of visual token embeddings to generate a semantic processing result at a token level, wherein the semantic processing result includes, for at least some of the semantic tokens, at least one of:
   a predicted location for each of a plurality of entities in the document page image,
   a predicted document type of a document page depicted in the document page image, or
   a predicted answer to a question about the document page depicted in the document page image.

2. The computer-implemented method of claim 1, wherein generating the plurality of semantic tokens includes using a trained token detection model to generate the plurality of semantic tokens.

3. The computer-implemented method of claim 2, wherein the trained token detection model includes a transformer model.

4. The computer-implemented method of claim 2, wherein generating the plurality of semantic tokens includes predicting, for each word token among the plurality of semantic tokens, a token type that indicates a word token.

5. The computer-implemented method of claim 2, wherein, for each of the plurality of special tokens, the token type of the special token indicates at least one of a checkbox token, a signature token, a figure token, or a stample token.

6. The computer-implemented method of claim 1, wherein generating the plurality of semantic tokens includes performing a text recognition operation to obtain textual content for each word token among the plurality of word tokens.

7. The computer-implemented method of claim 1, wherein, for each of the plurality of special tokens, the token type of the special token indicates at least one of a checkbox token, a signature token, a figure token, or a stample token.

8. The computer-implemented method of claim 1, wherein:
   the predicted token type of a first special token of the plurality of special tokens indicates at least one of a checkbox token, a signature token, a figure token, or a stample token, and
   the predicted token type of a second special token of the plurality of special tokens indicates at least one other of a checkbox token, a signature token, a figure token, or a stample token.

9. The computer-implemented method of claim 1, wherein each of the plurality of visual token embeddings indicates a one-dimensional position of the token within a sequence of visual tokens among the plurality of visual tokens.

10. The computer-implemented method of claim 1, wherein the semantic processing result includes, for each of the plurality of entities in the document page image, the predicted location of the entity and a predicted classification of the entity.

11. The computer-implemented method of claim 10, wherein each of the plurality of entities is a named entity.

12. The computer-implemented method of claim 1, wherein the semantic processing result includes the predicted answer to the question about the document page depicted in the document page image, wherein the predicted answer is a natural-language answer and the question is a natural-language question.

13. A document image processing system, the system comprising:
   one or more processing devices; and
   one or more non-transitory computer-readable media communicatively coupled to the one or more processing devices, wherein the one or more processing devices are configured to execute program code stored in the one or more non-transitory computer-readable media and thereby perform operations comprising:

based on at least a document page image, generating a plurality of semantic tokens that includes a plurality of word tokens and a plurality of special tokens, wherein:
  each special token among the plurality of special tokens represents a non-textual semantic element of the document page image, and
  generating the plurality of semantic tokens includes predicting, for each special token among the plurality of special tokens, a token type of the special token;
generating, for each semantic token among the plurality of semantic tokens, a corresponding semantic token embedding among a plurality of semantic token embeddings, wherein each semantic token embedding that corresponds to a special token indicates the predicted token type of the corresponding special token, and wherein each semantic token embedding comprises:
  a one-dimensional (1D) positional embedding indicating a position of the semantic token within a sequence of semantic tokens among the plurality of semantic tokens within the document page image, and
  a two-dimensional (2D) positional embedding indicating a spatial layout position of the corresponding semantic token within the document page image;
based on at least the document page image, generating a plurality of visual token embeddings, wherein each visual token embedding indicates a position of a corresponding visual token within the document page image; and
applying a trained multimodal fusion model comprising attention mechanisms to process an input that is based on the plurality of semantic token embeddings, including respective 1D positional embeddings indicating sequential text order positions and respective 2D positional embeddings indicating spatial layout positions and the plurality of visual token embeddings to generate a semantic processing result at a token level, wherein the semantic processing result includes, for at least some of the semantic tokens, at least one of the following:
  a predicted location for each of a plurality of entities in the document page image,
  a predicted document type of a document page depicted in the document page image, or
  a predicted answer to a question about the document page depicted in the document page image.

14. The document image processing system of claim 13, wherein generating the plurality of semantic tokens includes using a trained token detection model to generate the plurality of semantic tokens.

15. The document image processing system of claim 14, wherein the trained token detection model includes a transformer model.

16. The document image processing system of claim 14, wherein generating the plurality of semantic tokens includes predicting, for each word token among the plurality of semantic tokens, a token type that indicates a word token.

17. The document image processing system of claim 13, wherein, for each of the plurality of special tokens, the token type of the special token indicates at least one of a checkbox token, a signature token, a figure token, or a stample token.

18. The document image processing system of claim 17, wherein the predicted token type of a first token of the plurality of semantic tokens is different than the predicted token type of a second token of the plurality of semantic tokens.

19. One or more non-transitory computer-readable media storing computer-executable instructions that when executed by one or more processors cause the one or more processors to perform operations comprising:
  based on at least a document page image, generating a plurality of semantic tokens that includes a plurality of word tokens and a plurality of special tokens, wherein:
    each special token among the plurality of special tokens represents a non-textual semantic element of the document page image, and
    generating the plurality of semantic tokens includes predicting, for each special token among the plurality of special tokens, a token type of the special token;
  generating, for each semantic token among the plurality of semantic tokens, a corresponding semantic token embedding among a plurality of semantic token embeddings, wherein each semantic token embedding that corresponds to a special token indicates the predicted token type of the corresponding special token, and wherein each semantic token embedding comprises:
    a one-dimensional (1D) positional embedding indicating a position of the semantic token within a sequence of semantic tokens among the plurality of semantic tokens within the document page image, and
    a two-dimensional (2D) positional embedding indicating a spatial layout position of the corresponding semantic token within the document page image;
  based on at least the document page image, generating a plurality of visual token embeddings, wherein each visual token embedding indicates a position of a corresponding visual token within the document page image; and
  applying a trained multimodal fusion model comprising attention mechanisms to process an input that is based on the plurality of semantic token embeddings, including respective 1D positional embeddings indicating sequential text order positions and respective 2D positional embeddings indicating spatial layout positions and the plurality of visual token embeddings to generate a semantic processing result at a token level, wherein the semantic processing result includes, for at least some of the semantic tokens, at least one of the following:
    a predicted location for each of a plurality of entities in the document page image,
    a predicted document type of a document page depicted in the document page image, or
    a predicted answer to a question about the document page depicted in the document page image.

* * * * *